(12) United States Patent
Hofmeister et al.

(10) Patent No.: US 12,290,771 B2
(45) Date of Patent: May 6, 2025

(54) NANOFIBER FILTER WRAPS

(71) Applicant: ULTRA SMALL FIBERS, LLC, Wartrace, TN (US)

(72) Inventors: William H. Hofmeister, Nashville, TN (US); Robert A. Van Wyk, St. Petersburg, FL (US); Collin D. Anderson, Arlington Heights, IL (US)

(73) Assignee: ULTRA SMALL FIBERS, LLC, Wartrace, TN (US)

( * ) Notice: Subject to any disclaimer, the term of this patent is extended or adjusted under 35 U.S.C. 154(b) by 320 days.

(21) Appl. No.: 17/707,733

(22) Filed: Mar. 29, 2022

(65) Prior Publication Data

US 2023/0311036 A1 Oct. 5, 2023

(51) Int. Cl.
*B01D 39/14* (2006.01)
*B01D 39/16* (2006.01)
*B01D 63/10* (2006.01)

(52) U.S. Cl.
CPC .... *B01D 39/1607* (2013.01); *B01D 2239/025* (2013.01); *B01D 2239/0435* (2013.01)

(58) Field of Classification Search
CPC ...... B01D 2239/025; B01D 2239/0618; B01D 2239/1208; B01D 2239/1233; B01D 39/083; B01D 39/1623; B01D 39/14; B01D 39/16; B01D 39/1607; B01D 61/00; B01D 61/02; B01D 61/14; B01D 63/10; B01D 63/12; B01D 63/101; B01D 67/00; B01D 67/0002; B01D 67/0037; B01D 69/00; D04H 1/4382; D04H 1/43838; D04H 1/4391; D04H 1/70; D04H 3/016

See application file for complete search history.

(56) References Cited

U.S. PATENT DOCUMENTS

| | | | |
|---|---|---|---|
| 6,632,357 B1 * | 10/2003 | Barger | B01D 69/00 210/493.4 |
| 8,652,229 B2 | 2/2014 | Ensor | |
| 10,159,926 B2 | 12/2018 | Hofmeister | |
| 11,014,029 B2 | 5/2021 | Hofmeister | |
| 11,147,900 B1 | 10/2021 | Hofmeister | |
| 2014/0099445 A1 * | 4/2014 | Takeko | B01D 71/283 977/700 |
| 2015/0093550 A1 | 4/2015 | Hofmeister | |
| 2016/0222345 A1 | 8/2016 | Hofmeister | |
| 2017/0072349 A1 | 3/2017 | Hofmeister | |
| 2017/0320057 A1 | 11/2017 | Hofmeister | |

(Continued)

*Primary Examiner* — Allison G Fitzsimmons
(74) *Attorney, Agent, or Firm* — Eric B. Fugett; Mark A. Pitchford; Pitchford Fugett, PLLC

(57) ABSTRACT

A nanofiber filter wrap is a filter element comprising a polymer film including a first surface, a second surface opposite the first surface, an array of nanofibers extending from the first surface, a first end, a second end opposite the first end, and opposing first and second edges extending from the first end to the second end. The polymer film is wound or folded to form a plurality of spaced adjacent layers defining interlayer gaps extending through the filter element from the first edge to the second edge substantially normal to a basal plane defined by the second edge of the polymer film. A fluid flowed can be flowed through the interlayer gaps to contact at least a portion of the array of nanofibers whereby a contaminant contained in the fluid is at least partially filtered from the fluid.

13 Claims, 37 Drawing Sheets

(56) References Cited

U.S. PATENT DOCUMENTS

| | | |
|---|---|---|
| 2018/0353883 A1 | 12/2018 | Hofmeister |
| 2019/0314746 A1 | 10/2019 | Leung |
| 2020/0039122 A1 | 2/2020 | Hofmeister |
| 2020/0360923 A1 | 11/2020 | Hofmeister |
| 2020/0368655 A1 | 11/2020 | Hofmeister |
| 2021/0079352 A1 | 3/2021 | Hofmeister |

* cited by examiner

NANOFIBER FILTER WRAPS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present disclosure relates generally to filter media and filter devices, and more specifically to filter media and filter devices which combine user-defined arrays of nanofibers and elongate elements or strips that may be wrapped, folded, or coiled to create filter media that provide the benefits of nanofibers in a form that can be utilized in a manner similar to conventional filter media.

Fibrous filter media are used in various types of filter devices to trap large and small particles in liquid and gas streams. Such filter media are typically formed from multiple layers of coarse and fine fibers extending parallel to an upstream surface of the filter media. An outer layer of coarse fibers forms a bulk filtration layer for filtering of larger particles, while an inner or underlying layer of fine fibers provides filtering of small particles. Fine fibers are often provided in a thin layer laid down on a supporting permeable substrate or used with one or more permeable protective layers to obtain a variety of benefits, including increased efficiency, reduced initial pressure drop, cleanability, reduced filter media thickness, and to provide a selectively impermeable barrier to various liquids, such as water. However, prior approaches have several inherent disadvantages, including the need for a supporting substrate, a risk of delamination of the fine fiber layer from the substrate, more rapid loading of the filter by captured particles, the alignment of fine fibers parallel to the media face surface, and an inability to control spacings between fine fibers.

In addition to filtering mechanisms, on the molecular level, fibrous materials also trap contaminants with electrostatic forces, including ionic bonding, hydrogen bonding, and Van der Waals forces. These electrostatic interactions occur on the fiber surface. Because these interactions are known to increase non-linearly at sub-micron length (diameter) scales, functional improvement in fibrous filter media is largely based on minimizing denier (linear mass density or fiber diameter). Although the production of filter media comprising very fine fibers having a high surface-to-volume ratio, such as microfibers and nanofibers, has recently been emphasized in the industry, processing limitations associated with traditional methods of producing such fibers limit the utility of these materials in filtration applications.

The benefits realized through the use of nanofibers for filtering contaminants from a fluid stream are well known, and the technology is widely used. As currently commonly practiced, a thin layer of electrospun or melt-blown nanofibers is deposited on a porous substrate. Nanofibers deposited using these processes form a non-woven mat that lacks physical strength. This makes handling of prior art nanofiber mats without a suitable permeable substrate impractically difficult for filter manufacturing. The unique filtering properties of a nanofiber mat derive from the diameter of the nanofibers, and these properties are currently only obtainable with fibers formed into these non-woven constructs. Filter media formed of micro-fibers are easily handled during filter manufacturing, but because of their larger diameter of the fibers lack the enhanced filtering abilities of nanofibers. Accordingly, to achieve these enhanced properties in a filter, nanofibers are commonly deposited onto microfiber media in the manner previously described.

Nanofibers for prior art filter applications are commonly made by electrospinning, a method that requires the use of high voltages and a flowing polymer solution containing solvents that evaporate during production. Ensor, et al. in U.S. Pat. No. 8,652,229 describe methods for electrospinning nanofibers and forming filter elements therefrom. In the methods described, the electrospinning process requires electrical potentials in the 25 kV to 30 kV range and the close control of several process parameters. The rates of nanofiber production are low in the examples given. It is not an environmentally friendly process due to the solvents required. Electrospinning produces an interconnected web (or mat) of continuous small fibers with length to diameter ratios generally 1,000,000:1 or greater.

When forming nanofibers by electrospinning, the nanofiber materials are limited to polymers that can be mixed with a solvent to achieve the properties required for the process.

In electrospinning, the fibers of a closely controlled diameter are deposited onto a substrate. The substrate may be a flat plate oriented normal to the axis of the origin of the solution stream. Alternatively, the substrate may be a rotating element with a cylindrical, conical or other radially symmetric shape, the axis of rotation being perpendicular to the axis of the solution stream. Or the substrate may be a rotating disc with the axis of rotation parallel to the axis of the solution stream. Each of these substrate forms allow the forming of fiber mats configured to achieve specific design objectives through optimizing the deposition pattern of the fibers. If translation of the substrate in a plane normal to the solution stream is added to any of the substrate configurations, the deposited fiber may be given a directionality. Indeed, the fiber mat may be formed with a predetermined pattern to achieve design objectives for a given application. Microfiber or nanofiber mats with a particular preferential orientation of the fibers are frequently referred to as "ordered", and in some cases an "ordered matrix", or "ordered construct". The "order" to which this refers, then, is that the elongate continuous fibers forming the mat do not have a random directionality, but rather have a greater portion oriented parallel to a first axis than to a second axis. This is a two-dimensional effect only since the fiber mat forms a thin sheet, frequently membrane-like.

Prior art nanofiber mats cannot withstand tensile loading. Because nanofibers forming the mat have very low structural strength, increasing the number nanofibers does not appreciably increase the thickness of the mat, but simply creates a denser mat with decreased porosity. When the nanofiber mat manufactured by the electrospinning method is used to form an air filter, nanofibers (fibers) can be easily clogged (that is, packing can easily occur), resulting in a decrease in air permeability and an increase in pressure loss. Since clogging can easily occur, there have been problems in that the pressure loss may easily increase and the service life of an air filter may be shortened.

To address these drawbacks, Konishi, in US Patent Application Publication No. 2018/0353883 discloses an alternate method (not electrospinning) for forming a non-woven mat of nanofibers. Konishi's method forms a mat of fibers that have a range of diameters that average less than one micron, but that contains fibers of larger diameters so as to give the mat increased thickness and spacing between the nanofibers. The number of fibers having fiber diameters ranging from 2 times up to 10 times the average fiber diameter of the constituent fibers is in a range of 2 to 20% of a total number of the constituent fibers. The fiber mat is deposited onto a non-woven fabric using a complex process. Although the thickness of the mat is somewhat increased, the long continuous fibers are randomly deposited in a two-dimensional construct similar to electrospun mats.

Microfibers for filters and other applications may be made by melt blowing, a fiber making process in which melted polymer is extruded through a plurality of small orifices surrounded by streams of a high velocity gas. A plurality of randomly oriented fibers is deposited onto a substrate so as to form a non-woven mat or fabric. The process does not require the use of solvents or high voltages, and the fiber deposition rates can be orders of magnitude greater than those possible by electrospinning. Melt blown fibers are generally in the range of two to five microns with a wide diameter distribution. Because the fibers are not drawn to a substrate by an electrostatic charge as in electrospinning, fiber mats formed by melt blowing are not membrane-like, but rather have fibers that are spaced one from another in the direction parallel to the blowing direction. The fibers are long and continuous with a random orientation. In some applications the mat is subsequently compressed to form a non-woven fabric. Melt blowing nanofibers is difficult since extremely small orifices are required and the molten plastic must flow through these orifices and remain in fiber form as they travel to the substrate. Surface tension in the molten fiber tends to cause the material to become droplets rather than fibers so as to reduce the surface energy. Accordingly, the polymers that can be successfully melt blown into nanofibers is limited and the process has not yet been scaled up sufficiently for commercial use. The process remains an efficient method for forming microfiber mats and non-woven fabrics for filters and other applications.

In another approach, increasing the nanofiber content of a filter is accomplished through the use of a stratified filter construction with layers of nanofibers interspersed between microfiber substrate layers.

Whether a nanofiber mat is formed by electrospinning, Konshi's method, or another means, the mat is a thin construct, frequently membrane-like. Because of this, the mat is oriented essentially normal to the flow stream direction. The density of the mat is limited by the backpressure that the filtering process can tolerate.

The beneficial effects of including nanofibers in a filter may be temporarily enhanced by electrostatically charging the nanofibers. For instance, it has been demonstrated that charging nanofiber mats interspersed between insulating separating permeable layers causes a significant increase in the filter efficiency. This is described in detail in US Patent Application No. 2019/0314746 by Leung. However, the applied electrostatic charge degrades over time so that filters of this type have a finite shelf life, making them impractical for some applications.

Polymeric materials have an inherent electrostatic charge that creates an attractive force, the force at any given point on a surface being inversely dependent on the radius of curvature of the external surface at that point. When the radius of curvature is large the electrostatic attractive force is weak. As the radius is decreased the attractive force increases, a factor exploited in nanofiber filter media. The small diameter of the nanofibers results in an attractive force that is orders of magnitude greater than that of microfibers allowing nanofibers to draw contaminant particles with greater force for removal from a fluid stream. This electrostatic charge is intrinsic to the material and does not degrade in the manner of an applied electrostatic charge.

Hofmeister, et al. in U.S. Pat. No. 10,159,926 teaches media and devices for filtering or separating a contaminant from a fluid liquid or gas stream. The Hofmeister devices incorporate flow passages formed by layered laminas comprising tunable topographies of user-defined arrays of nanofibers and, optionally, nanoholes. These tunable nanofiber topographies selectively remove contaminants from the fluid stream as it flows through spaces between adjacent laminas, parallel to the surface of the laminas, with at least one of these surfaces having nanofibers formed thereon. Contaminants are drawn to the nanofibers by electrostatic forces in the manner previously described. Nanofiber filters constructed in accordance with the Hofmeister patent can be tuned to remove specific contaminants such as pathogens, chemical contaminates, biological agents, and toxic or reactive compounds from a fluid to be filtered by selecting a suitable nanofiber diameter, height, distance between nanofibers, interlaminar gap and material.

The Hofmeister filter construction requires a rigid housing to maintain the orientation and alignment of the laminas making up the filter so that a continuous flow path is created between an inlet and outlet formed in the housing, the flow passing through interlaminar spaces formed therein.

Accordingly, applications for the Hofmeister filter with its tuned topography are limited to those in which the fluid stream is directed through spaces formed between adjacent, aligned laminas, the alignment being maintained by a rigid housing structure. Because of this, the benefits of filter elements comprising a tuned topography formed of nanofiber arrays cannot be realized in filtering devices that do not/cannot include a rigid housing and flow between adjacent parallel laminas.

Hofmeister et al., in U.S. Pat. No. 11,014,029 teaches filter media made up of elongate filter ribbons with a flexibly planar film portion with arrays of nanofibers formed on a surface thereof. The ribbons may be formed into mats or non-woven fabrics, or may be confined within a cavity of a filter housing. The non-woven fabrics or mats may be part of a filter construct formed of layers of differentiated filter media configured to remove contaminants of increasingly smaller sizes, with filter ribbons of the invention being preferably in the downstream-most portion of the construct. Additionally, because the nanofiber arrays of the ribbons may have topographies that are tuned to remove specific contaminants, successive layers of filter ribbons may be configured to each remove a specific contaminant from the fluid stream. The ribbons taught by Hofmeister may be formed into a non-woven fabric, however, the ribbons will have a random orientation and all of the ribbon surfaces may not be optimally oriented for interaction with the fluid stream. Accordingly, the efficiency of the filter ribbon media will be less than that of the previously described Hofmeister filter configuration in which all flow is through the interlaminar spaces, optimal for contaminant removal.

There is a need for filter media that exploit the inherent electrostatic properties of nanofibers in optimized configurations in which fluid flow across the nanofiber arrays is not random as in the case of the filter ribbons, but rather is substantially parallel to the nanofiber bearing surface of the media. The media should not rely on a rigid enclosure to maintain orientation and alignment of the nanofiber bearing elements, but the alignment should arise from the construct of the filter element formed from the media. Such media are the subject of this invention.

Accordingly, it is an object of the present invention to provide nanofiber filter media that can withstand tensile loading.

It is also an object of the present invention to provide nanofiber filter media that achieve high collection efficiency and reduced clogging (packing) between fibers.

It is also an object of the present invention to provide nanofiber filter media that does not require deposition on a substrate during manufacture.

It is also an object of the present invention to provide nanofiber filter media wherein the nanofibers are configured to optimally exploit the electrostatic properties of the nanofibers.

It is also an object of the present invention to provide nanofiber filter media wherein the nanofibers cannot be easily expelled from the filter media.

It is also an object of the present invention to provide nanofiber filter media wherein a filter element formed therefrom may be handled in the same manner as a conventional prior-art filter element.

It is further an object of the present invention to provide nanofiber filter media at lower cost than current nanofiber media.

It is further an object of the present invention to provide nanofiber filter media that may be produced without the need for high voltages or environmentally detrimental solvents.

It is also an object of this invention to provide nanofiber filter media that can remove biological contaminants including viruses from an air stream.

BRIEF SUMMARY

These and other objects are achieved in devices and methods of the present invention which addresses filter media, filtering devices formed therefrom, and methods for their use wherein the filter media is formed of elongate flexible strips of film with tuned arrays of nanofibers formed on a surface thereof. These strips of film, hereinafter referred to as "filter wraps" are wound or folded in a manner to create a "filter element" wherein the filter wraps form the filter media. The filter element so formed has a basal plane defined by edges of the wound filter layers. When wound or folded, the filter wraps have between adjacent layers inter-layer spaces or "gaps" through which fluid may flow, the spaces or gaps being perpendicular to the basal plane. In some embodiments one wall of the inter-wrap space has formed thereon nanofiber arrays of the present invention. In other embodiments both walls of the inter-layer space have nanofiber arrays formed thereon. In some embodiments the interlayer space is filled with a second filter media. This second media may be configured to create turbulence so as to increase the filtering effectiveness of the nanofiber arrays in the inter-layer space. In some embodiments the second media may comprise elongate film strips that have arrays of nanofibers formed on a surface thereof. In some embodiments, the second filter media may be formed into a non-woven fabric or mat. In some embodiments this mat may be affixed to the filter wrap of the present invention to form a "filter wrap assembly" that may be wound or folded as previously described.

The filter wraps of filter media of the present invention are formed of a suitable polymeric film, have a flexible planar portion of predetermined thickness and width, and have an array of nanofibers formed on at least one surface of the film. In a preferred embodiment the nanofibers are arranged in rows spaced a first distance apart, with the nanofibers within each row spaced a second distance apart. In some embodiments the first and second distances are equal. In others they are not. The diameter of each nanofiber generally decreases along the nanofiber's length from a first diameter at its base, and the lengths of the fibers in an array fall within a predetermined range. The form of a fiber is largely determined by the ratio of the length of the fiber to its diameter. At low ratios the fiber may have a post-like appearance, while at high ratios the fiber may be tendrilous. Between these extremes is a continuum of nanofiber configurations that share the common characteristic of decreasing diameter over their finite length. Because the electrostatic force at a point on a surface is inversely related to the radius of curvature of the surface at that point, the electrostatic force on a nanofiber of filter media of the present invention is not constant along its length. The electrostatic force generally increases with the general distal reduction in diameter, reaching its maximum at the fiber's distal end. In certain embodiments the ends of the nanofibers are configured to further enhance the electrostatic potential. The electrostatic force of nanofibers formed on filter wraps of the present invention has maximal intensity at the distal portions of the nanofibers—the portion that is most exposed to the fluid stream. This concentration results in much higher attractive forces to contaminants in the fluid stream than the uniform-diameter, continuous fibers of non-woven nanofiber mats previously herein described and currently in use in filter applications. Because of this, nanofiber arrays formed on filter wraps of the present invention are able to draw contaminants from a flow stream with higher field gradients than other, prior art, nanofiber filter elements. Filter wraps of the present invention may have perforations formed therein so that flow can occur not only parallel to the surfaces of the of the wraps but also between adjacent inter-layer spaces formed in a filter element of the present invention.

The non-random placement of nanofiber tips in a nanofiber array represents a significant enhancement over nanofiber structures produced by other methods, such as electrospinning, because each fiber forming an array of nanofibers described herein has an independent "end" or "tip." The "ends" or "tips" of the nanofibers have stronger field gradients than the body of the fibers because gradients are enhanced with curvature and the curvature is highest at the tip. Thus, the use in filter devices of nanofiber arrays having millions of tips per square centimeter of filter wrap surface preserves and enhances the local fiber field gradient far better than traditional fibrous filter media and devices which rely on layered mats of fibers laid down on a substrate.

Filter wraps of the present invention have appreciable physical strength and may be handled independent of a substrate. Filter elements formed of these filter wraps are constructs that may be incorporated in a wide range of filter configurations.

Filter wraps of the present invention with their nanofiber arrays are formed without the use of solvents or high voltage. Specifically, nanofiber arrays of the present invention are formed in a casting process in which a suitable polymer heated to a temperature sufficient to allow flow, is extruded onto a first surface of a mold with an array of nanoholes formed therein, and subsequently flows into the nanoholes of the mold. A surface of a second compressing or quenching element may be used. Subsequently, the polymeric material is cooled sufficiently so that when the compressing element is removed, the polymer with the attached molded nanofibers can be stripped from the mold surface. The result is a planar polymeric film portion with an array of nanofibers integrally formed on a first surface thereof, the form of the nanofiber array being complementary to the nanohole array in the mold. In a preferred embodiment, the mold and second element are rotating cylinders, the polymer in molten form being introduced onto the circumferential surface of the mold, and subsequently compressed between the mold and the cylindrical surface of the second element. This compression enhances the cooling of the material so that it can be subsequently peeled from the mold. The resulting film with arrays of integral nanofibers formed thereon is subsequently slit to form elongate filter wraps of the present invention. In some embodiments, perforations are formed in the filter wrap Numerous other objects, advantages and features of the present disclosure will be readily apparent to those of skill in the art upon a review of the following drawings and description of exemplary embodiments.

BRIEF DESCRIPTION OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

DETAILED DESCRIPTION

Figure 1A:
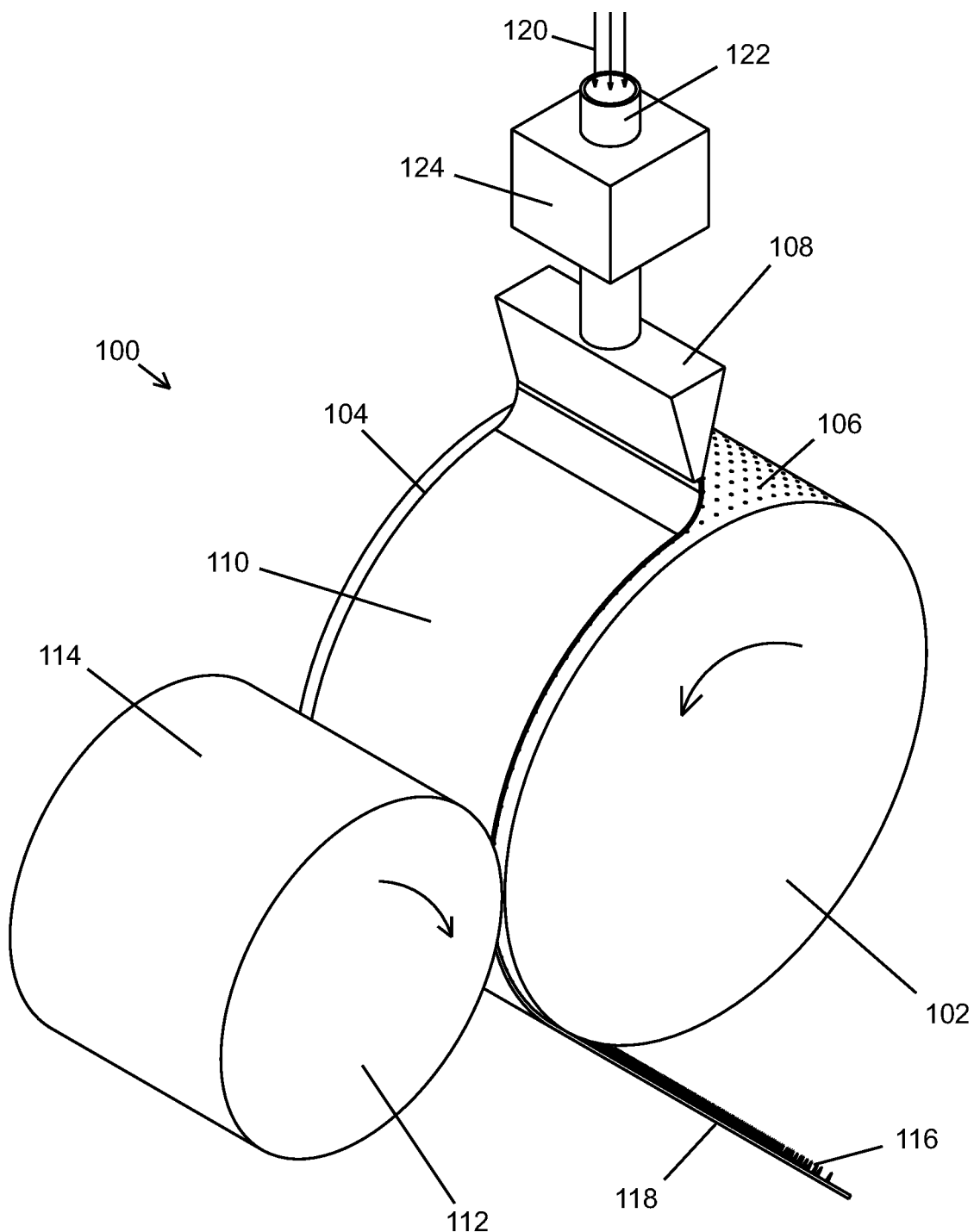
FIG. 1A is a first perspective view of a system for making continuous strips of polymer film with nanofiber arrays formed on a surface thereof for filter wraps of the present invention.
Figure 1B:
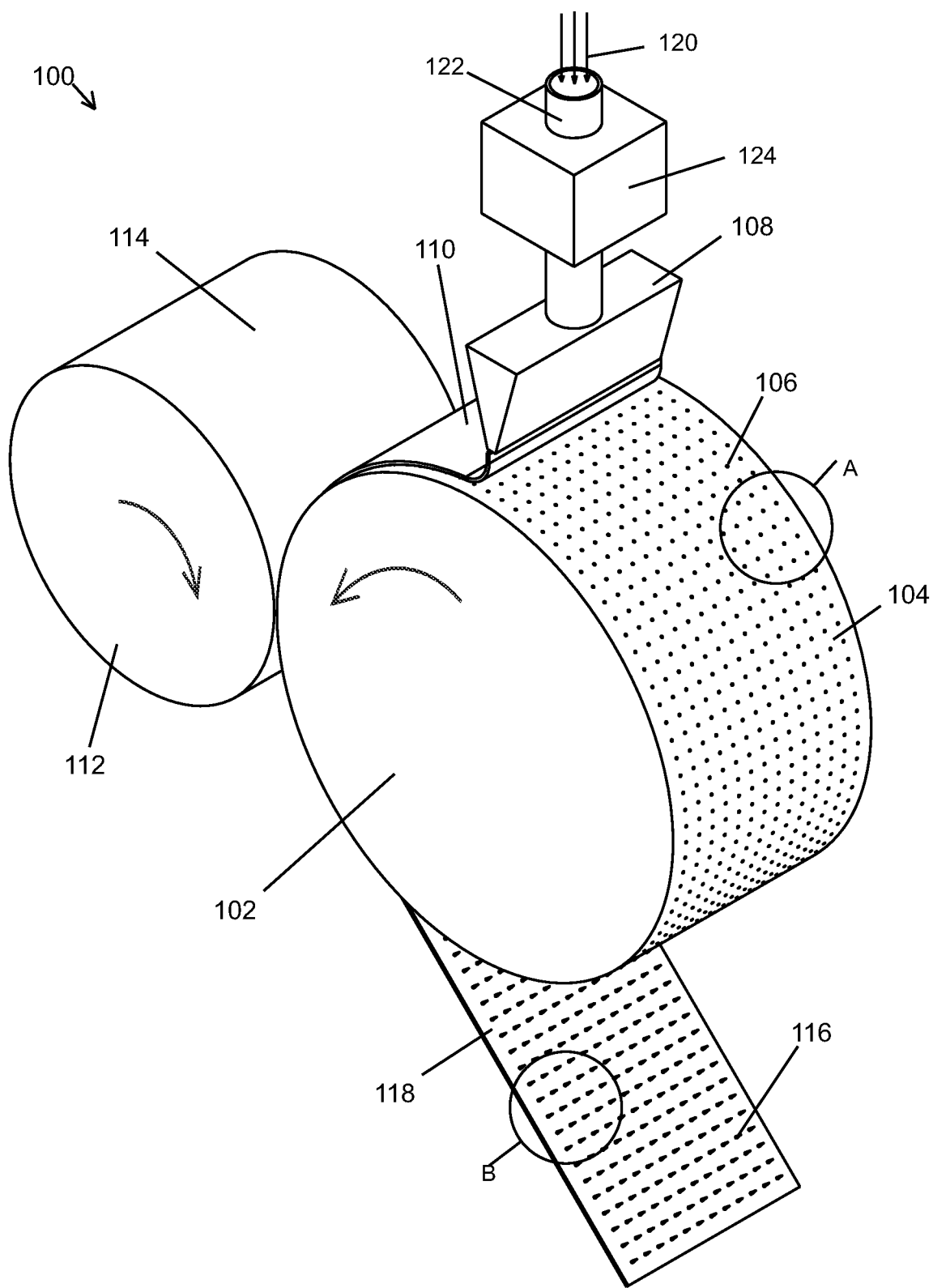
FIG. 1B is a second perspective view of the objects of FIG. 1A.
Figure 1C:
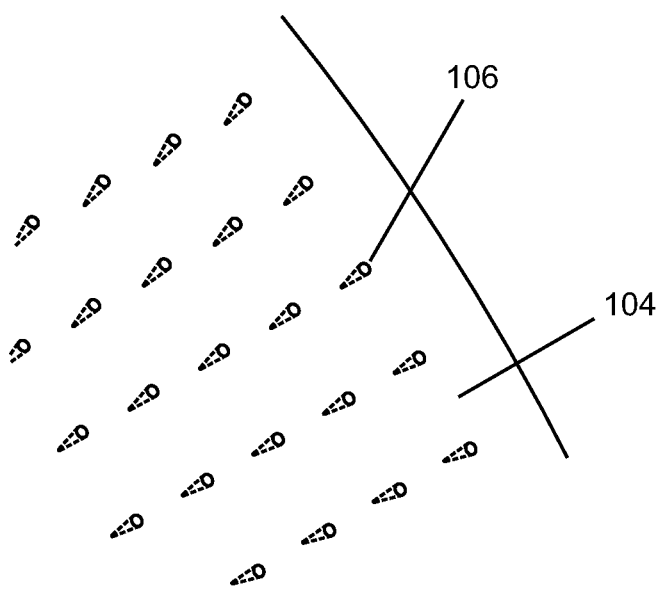
FIG. 1C is an expanded view of the objects of FIG. 1B at location A.
Figure 1D:
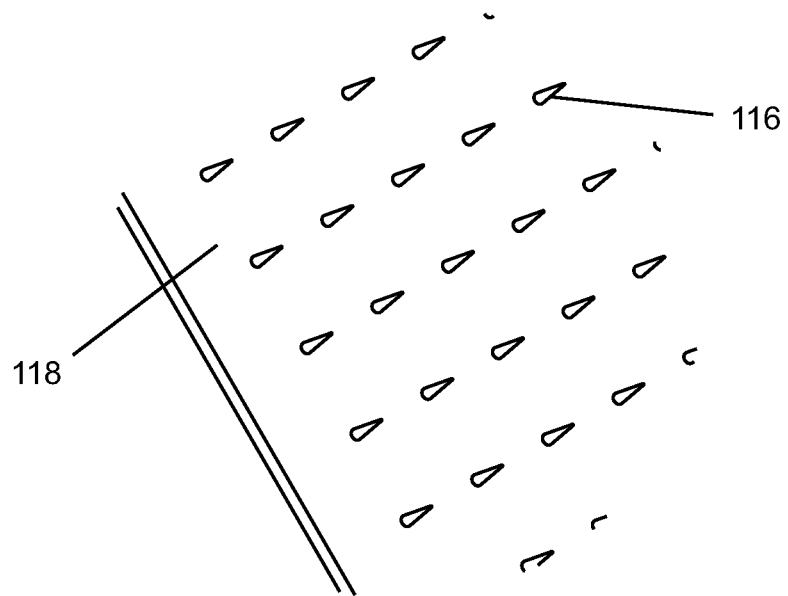
FIG. 1D is an expanded view of the objects of FIG. 1B at location B.
Figure 2:
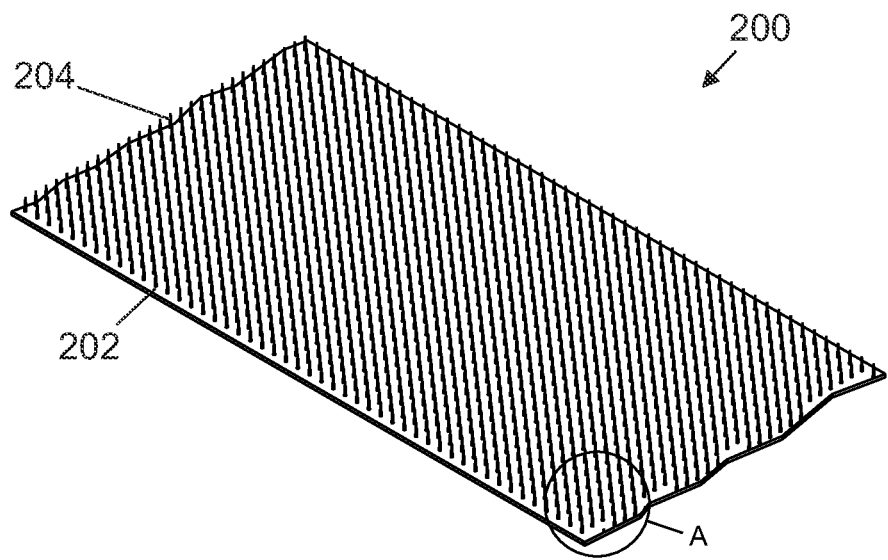
FIG. 2 is a perspective view of a portion of a film with nanofiber arrays formed on a surface thereof for filter wraps of the present invention.
Figure 3:
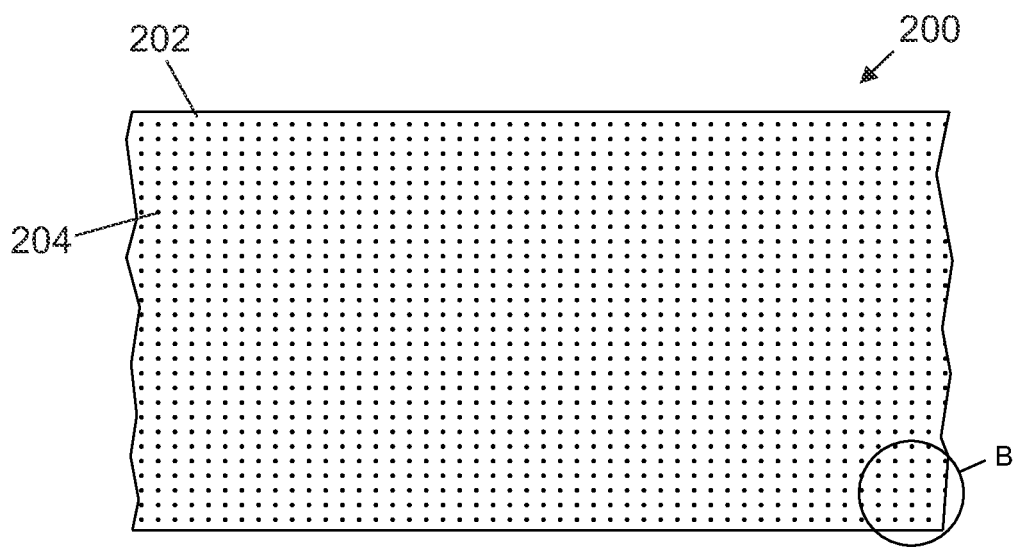
FIG. 3 is a plan view of the objects of FIG. 2.
Figure 4:
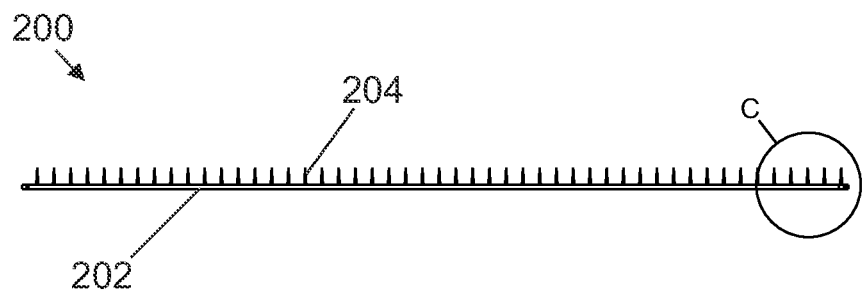
FIG. 4 is a side elevational view of the objects of FIG. 2.
Figure 5:
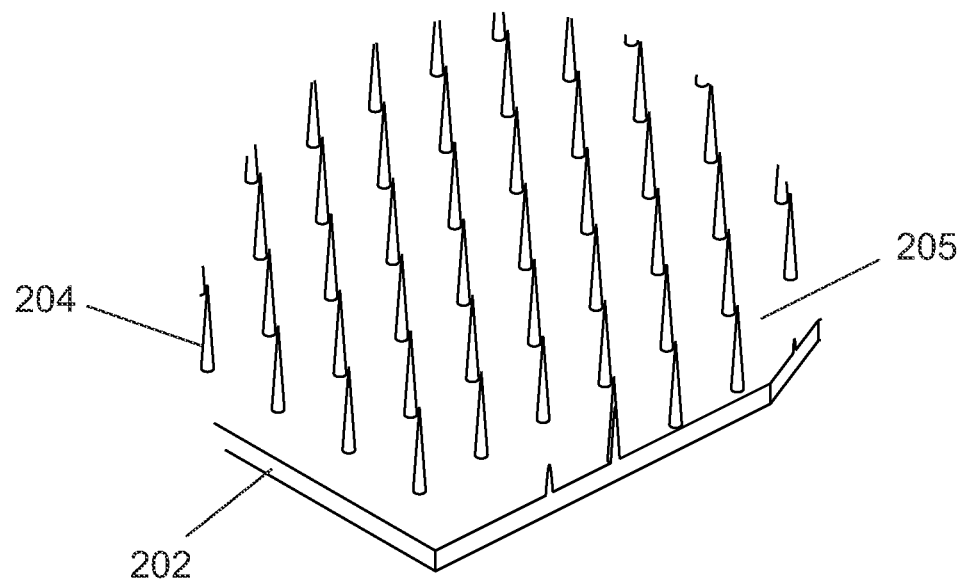
FIG. 5 is an expanded view of the objects of FIG. 2 at location A depicting a first nanofiber configuration for a filter wrap of the present invention.
Figure 6:
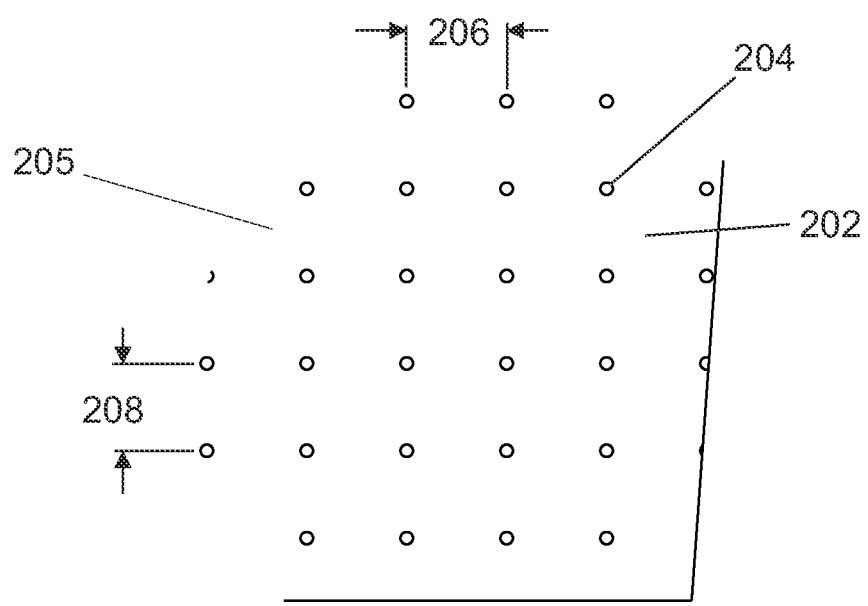
FIG. 6 is an expanded view of the objects of FIG. 3 at location B.
Figure 7:
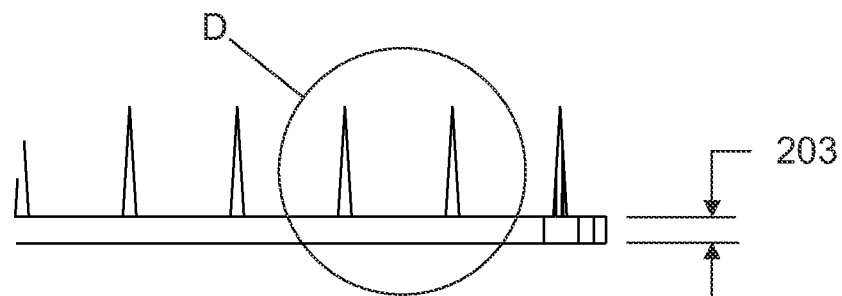
FIG. 7 is an expanded view of the objects of FIG. 4 at location C.

The details of one or more embodiments of the presently disclosed subject matter are set forth in this document. Modifications to embodiments described in this document, and other embodiments, will be evident to those of ordinary skill in the art after a study of the information provided herein. The information provided in this document, and particularly the specific details of the described exemplary embodiments, is provided primarily for clearness of understanding and no unnecessary limitations are to be understood therefrom. In case of conflict, the specification of this document, including definitions, will control.

The present disclosure relates to filter media and devices for removing a contaminant from a fluid stream. In a general embodiment, the nanofiber filters disclosed herein are designed to filter a substance or contaminant from a fluid stream using one or more user-defined arrays of nanofibers, such as those described in U.S. Patent Application Publication No. 2013/0216779 which is incorporated herein by reference in its entirety.

While the terms used herein are believed to be well understood by one of ordinary skill in the art, definitions are set forth herein to facilitate explanation of the subject matter disclosed herein.

Unless defined otherwise, all technical and scientific terms used herein have the same meaning as commonly understood by one of ordinary skill in the art to which the subject matter disclosed herein belongs. Although any methods, devices, and materials similar or equivalent to those described herein can be used in the practice or testing of the presently disclosed subject matter, representative methods, devices, and materials are now described.

To facilitate the understanding of the embodiments described herein, a number of terms are defined below. The terms defined herein have meanings as commonly understood by a person of ordinary skill in the portions relevant to the present invention. The terminology herein is used to describe specific embodiments of the invention, but their usage does not delimit the invention, except as set forth in the claims.

The terms "a", "an", and "the" refer to "one or more" when used in this application, including the claims. Thus, for example, reference to "a contaminant" includes a plurality of particles of the contaminant, and so forth. The use of the word "a" or "an" when used in conjunction with the term "comprising" in the claims and/or the specification may mean "one," but it is also consistent with the meaning of "one or more," "at least one," and "one or more than one."

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and devices of the present disclosure, including components thereof, can comprise, consist of, or consist essentially of the essential elements and limitations of the embodiments described herein, as well as any additional or optional components or limitations described herein or otherwise useful.

This description and appended claims may include the words "below", "above", "side", "top", "bottom", "upper", "lower", "when", "upright", etc. to provide an orientation of embodiments of the invention to allow for proper description of example embodiments. The foregoing positional terms refer to the apparatus when in an upright orientation. A person of skill in the art will recognize that the apparatus can assume different orientations when in use. It is also contemplated that embodiments of the invention may be in orientations other than upright without departing from the spirit and scope of the invention as set forth in the appended claims. Further, it is contemplated that "above" means having an elevation greater than, and "below" means having an elevation less than such that one part need not be directly over or directly under another part to be within the scope of "above" or "below" as used herein.

The phrase "in one embodiment," as used herein does not necessarily refer to the same embodiment, although it may. Conditional language used herein, such as, among others, "can", "might", "may", "e.g.," and the like, unless specifically stated otherwise, or otherwise understood within the context as used, is generally intended to convey that certain embodiments include, while other embodiments do not include, certain features, elements and/or states.

Unless otherwise indicated, all numbers expressing physical dimensions, quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about," when referring to a value or to an amount of mass, weight, time, volume, concentration, percentage or a physical dimension such as length, width, or diameter, is meant to encompass variations of in some embodiments ±20%, in some embodiments ±10%, in some embodiments ±5%, in some embodiments ±1%, in some embodiments ±0.5%, and in some embodiments ±0.1% from the specified value or amount, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "fluid" is defined as any liquid or gas which can be passed through the filter media and filter devices disclosed herein. Multiple fluids having different specific gravities and viscosities can be used as well as gas and vapor streams, depending on the application.

As used herein, the term "nanofiber" refers to a fiber structure having a diameter of less than 1000 nanometers for more than half the length of the structure. In some embodiments, the nanofibers disclosed herein can comprise a tapered base portion and a relatively longer fiber portion which extends from the base portion. In such embodiments, the fiber portion has a diameter of less than 1000 nm and a length greater than that of the base portion, and the base portion can have a diameter of from about 10 micron to less than 1.0 micron. Additionally, in some embodiments, the base portion can also have a length of from about 1.0 micron to about 10 microns, and the fiber portion can have a length of from about 10 to 100 times greater than the length of the base portion. Nanofibers having larger diameter base portions in the range of from about 2.0 microns to about 10 microns are best suited for applications wherein the bases must provide stiffness to the nanofiber in the fluid stream.

In some preferred embodiments, nanofibers suitable for use in the nanofiber filter media and filter devices disclosed herein can have an overall length of from about 10 to about 100 microns. Accordingly, suitable nanofibers can also have a length to diameter ratio of from 10:1 to about 1000:1. In one embodiment, the length to diameter ratio is from about 10:1 to about 100:1. By contrast, nanofibers known in the art, including electrospun nanofibers, melt-blown nanofibers and microfiber-derived nanofibers (i.e., microfibers split during processing to obtain sub-micron diameter structures), typically have much greater length to diameter ratios in the range of 1,000,000:1 to 100,000,000:1. As a result, the nanofibers used in nanofiber filter media and filter devices disclosed herein can have from about 10 to about 1000 times more tips per unit length than electrospun nanofibers, melt blown nanofibers and microfiber derived nanofibers.

The related terms "nanofiber array" and "array of nanofibers," which are used interchangeably herein, collectively refer to a plurality of freestanding nanofibers of user-defined physical dimensions and composition integrally formed on and extending from a backing member, such as a film, according to user-defined spatial parameters. In some embodiments, the nanofiber arrays disclosed herein include nanofibers which extend from a surface of the backing member at an angle substantially normal to a plane containing the surface of the backing member from which the nanofibers extend. By contrast, electrospun nanofibers, melt-blown nanofibers, and microfiber-derived nanofibers are neither integrally formed on nor do they extend from a backing member.

User-tunable physical characteristics of the nanofiber arrays disclosed herein include fiber spacing, diameter (also sometimes referred to herein as "width"), height (also sometimes referred to herein as "length"), number of fibers per unit of backing member surface area (also referred to herein as "fiber surface area density"), fiber composition, fiber surface texture, and fiber denier. For example, nanofiber arrays used in the filter media and filter devices disclosed herein can comprise millions of nanofibers per square centimeter of backing member, with fiber diameter, length, spacing, material composition, and texture configured to perform a filtration function. In some embodiments, one or more of fiber surface area density, diameter, length, spacing, composition, and texture are controlled and optimized to perform a filtration function. In certain embodiments, the nanofiber arrays can be optimized or "tuned" to perform a specific filtration function or target a preselected substance or specific retentate. In further embodiments, an array of nanofibers disposed on a portion of a filter wrap forming a flow passage of a filter element disclosed herein is configured to filter a substance from a fluid containing the substance when the fluid is flowed through the flow passage.

The nanofiber arrays disclosed herein, when formed on a substantially planar surface of a backing member, can include nanofibers spaced along an X-axis and a Y-axis at the same or different intervals along either axis. In some embodiments, the nanofibers can be spaced from about 100 nm to 200 micron or more apart on the X-axis and, or alternatively, the Y-axis. In certain embodiments, the nanofibers can be spaced from about 1 micron to about 50 micron apart on one or both of the X-axis and the Y-axis. In a preferred embodiment, the nanofibers can be spaced from about 2 micron to about 7 micron apart on one or both of the X-axis and the Y-axis.

In some embodiments, an array of nanofibers can include nanofibers having an average length of at least 25 micron. In certain embodiments, the nanofibers can have a length of from about 10 micron to about 100 micron. In certain embodiments, the nanofibers can have a length of from about 15 micron to about 60 micron. In an exemplar embodiment, the nanofibers can have an average length of from about 20 micron to about 30 micron. In specific embodiments, the nanofibers can have a length of about 15.00 micron, 16.00 micron, 17.00 micron, 18.00 micron, 19.00 micron, 20.00 micron, 21.00 micron, 22.00 micron, 23.00 micron, 24.00 micron, 25.00 micron, 26.00 micron, 27.00 micron, 28.00 micron, 29.00 micron, 30.00 micron, 31.00 micron, 32.00 micron, 33.00 micron, 34.00 micron, 35.00 micron, 36.00 micron, 37.00 micron, 38.00 micron, 39.00 micron, 40.00 micron, 41.00 micron, 42.00 micron, 43.00 micron, 44.00 micron, 45.00 micron, 46.00 micron, 47.00 micron, 48.00 micron, 49.00 micron, 50.00 micron, 51.00 micron, 52.00 micron, 53.00 micron, 54.00 micron, 55.00 micron, 56.00 micron, 57.00 micron, 58.00 micron, 59.00 micron, or 60.00 micron.

The nanofiber backing member surface area density can range from about 25,000,000 to about 100,000 nanofibers per square centimeter. In some embodiments, the nanofiber surface area density can range from about 25,000,000 to about 2,000,000 nanofibers per square centimeter. In specific embodiments, the nanofiber surface density is about 6,000,000 nanofibers per square centimeter. In an exemplar embodiment, the nanofiber surface area density is about 2,000,000 nanofibers per square centimeter.

In some embodiments, an array of nanofibers can include nanofibers having an average denier of from about 0.001 denier to less than 1.0 denier. In an exemplar embodiment, the nanofibers forming a nanofiber array disclosed herein can be less than one denier and have a diameter ranging from about 50 nm to about 1000 nm.

Nanofiber arrays and methods for producing nanofiber arrays suitable for use in the filter media and filter devices disclosed herein are described by the present inventors in U.S. Patent Application Publication No. 2013/0216779, U.S. Patent Application Publication No. 2016/0222345, and White et al., Single-pulse ultrafast-laser machining of high aspect nanoholes at the surface of SiO2, Opt. Express. 16:14411-20 (2008), each of which is incorporated herein by reference in its entirety.

Reference is made herein to "filter wraps." As used herein a "filter wrap" is an elongate strip of film on a surface of which are formed arrays of nanofibers as previously described. In some embodiments, the ratio of the length of the filter wrap to the thickness of the filter wrap is between 20:1 and 100:1. In others the ration of the width to the thickness is between 100:1 and 500:1. In still others the ration of the width to the thickness is between 500:1 and 3,000:1. The ratio of the length of a filter wrap to the width of that filter wrap in some embodiments is between 10:1 and 100:1. In others the ratio is between 100:1 and 1,000:1. And in still others, the ratio of the length of the filter wrap to the width of that filter wrap is greater than 1,000:1.

Figure 22:
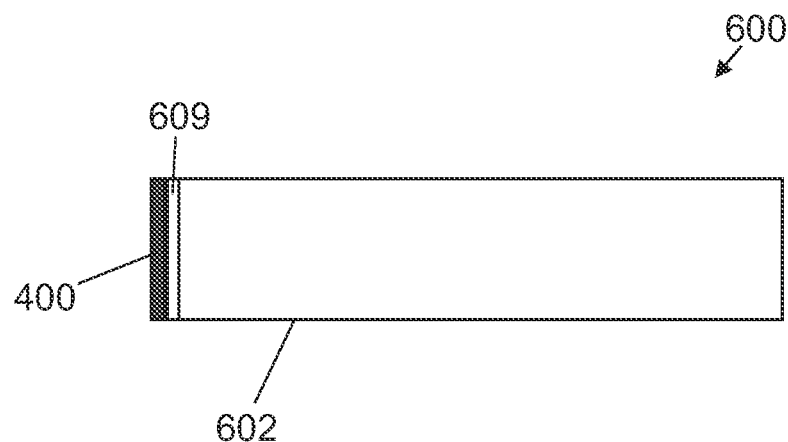
FIG. 22 is a side elevational view of the objects of FIG. 20.

Reference is made herein to "filter elements." As used herein a "filter element" is a construct of filter media of the present invention formed by wrapping or folding one or more filter wraps to create a structure that has a basal plane and boundaries of predetermined size and configuration. The filter wraps forming the filter element are oriented perpendicular to the basal plane (as exemplified in FIG. 22) and spaces between adjacent portions (i.e., layers) of the filter wrap provide a path for fluid flow through the media, the flow being normal to the basal plane (as exemplified in FIG. 20). Filter elements formed by wrapping of a filter wrap may have a spiral form when viewed normal to the basal plane. A filter element may be formed by a combination of wrapping and folding of filter wraps as required by external constraints.

A preferred method for manufacturing filter wraps of the present invention has the ability to produce continuous elongate strips of film with arrays of nanofibers formed on at least one surface thereof. Longitudinal slits are subsequently formed in the film strip to form multiple filter wraps of the present invention. In method 100, a variation of a film producing technique referred to as "chill roll casting" and depicted in FIGS. 1A through 1D, polymer 120 is supplied via tubular member 122 to extrusion head 108. Polymer 120 is heated above its melt point by heater 124 and the melted polymer 110 is then applied to rotating cylindrical roll 102 (referred to as a "chill roll") formed of silica or another suitable material. An array of nanoholes 106 is formed in the circumferential surface 104 of roll 102 so as to form a mold, the nanohole array being complementary to the array of nanofibers to be formed. The nanoholes are formed using methods previously described herein. Molten polymer 110 flows into nanoholes 106 as it is applied to circumferential surface 104 of rotating chill roll 102. Chill roll 102 is maintained at a temperature such that during a predetermined portion of the rotation of chill roll 102, polymer 110 in nanoholes 106 is cooled along with the portion of polymeric material 110 coating circumferential surface 104 of roll 102. A cylindrical metallic roll 112, commonly referred to as a "anvil roll" or "quench roll" functions as a compressing element and is positioned adjacent to chill roll 102 such that after a predetermined angular rotation of chill roll 102 polymeric material 110 coating the surface of chill roll 102 is compressed between surface 104 of chill roll 102 and surface 114 of the quench roll 112. As implied by the name "quench roll" polymeric material 110 undergoes rapid cooling during contact with quench/anvil roll 112 so that it may be subsequently stripped from the surface of chill roll 102 as a continuous elongate strip of film 118. When the polymer strip 118 is removed from chill roll 102, material 110 that had previously flowed into nanoholes 106 forms molded nanofibers 116 on a surface of film strip 118. Polymer 120 is not contained in a solution so the use of environmentally undesirable solvents is not required.

Under certain conditions, with suitable polymers, quench roll 112 is eliminated. The thickness of film strip 118 is determined by process parameters. These may include properties of polymer 120, the temperature of polymer 110 as it is deposited on surface 104 of chill roll 102, the temperature and rotational speed of chill roll 102, and other factors that affect the cooling of film strip 118. Under these conditions, material is drawn into nanoholes 106 of surface 104 of chill roll 102 by surface tension as a compressing element is not used.

Figure 8:
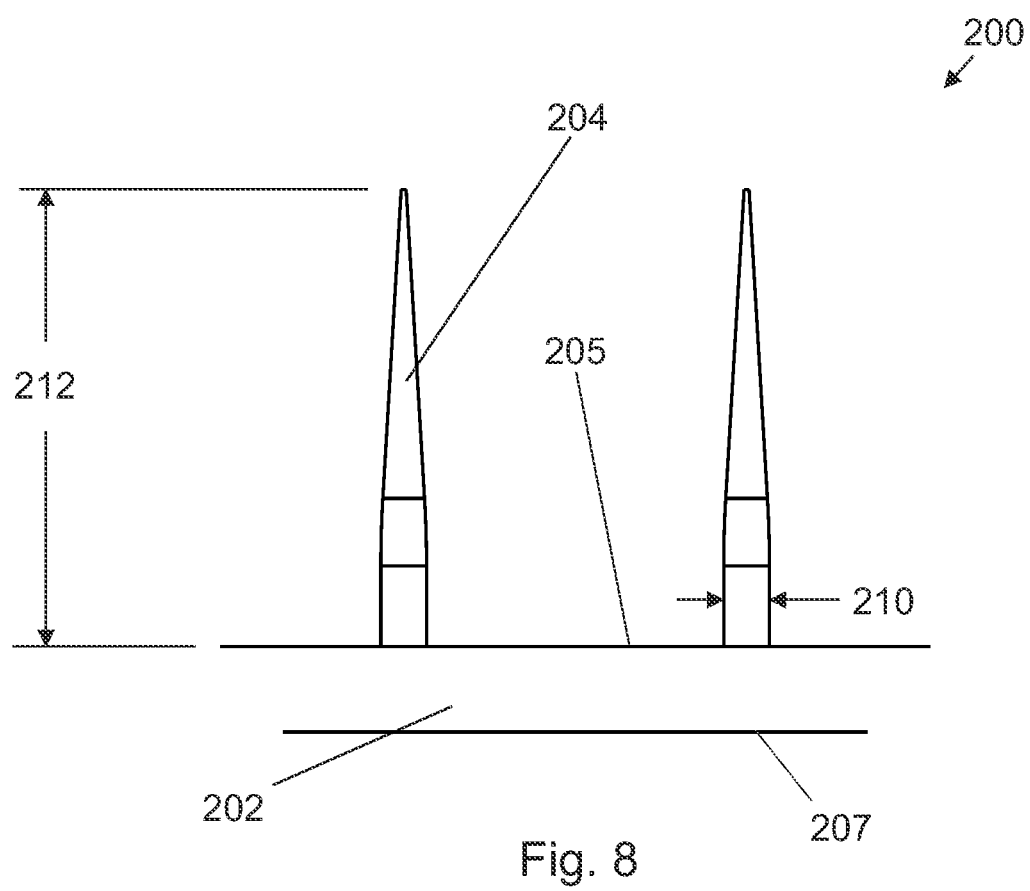
FIG. 8 is an expanded view of the objects of FIG. 7 at location D.
Figure 9:
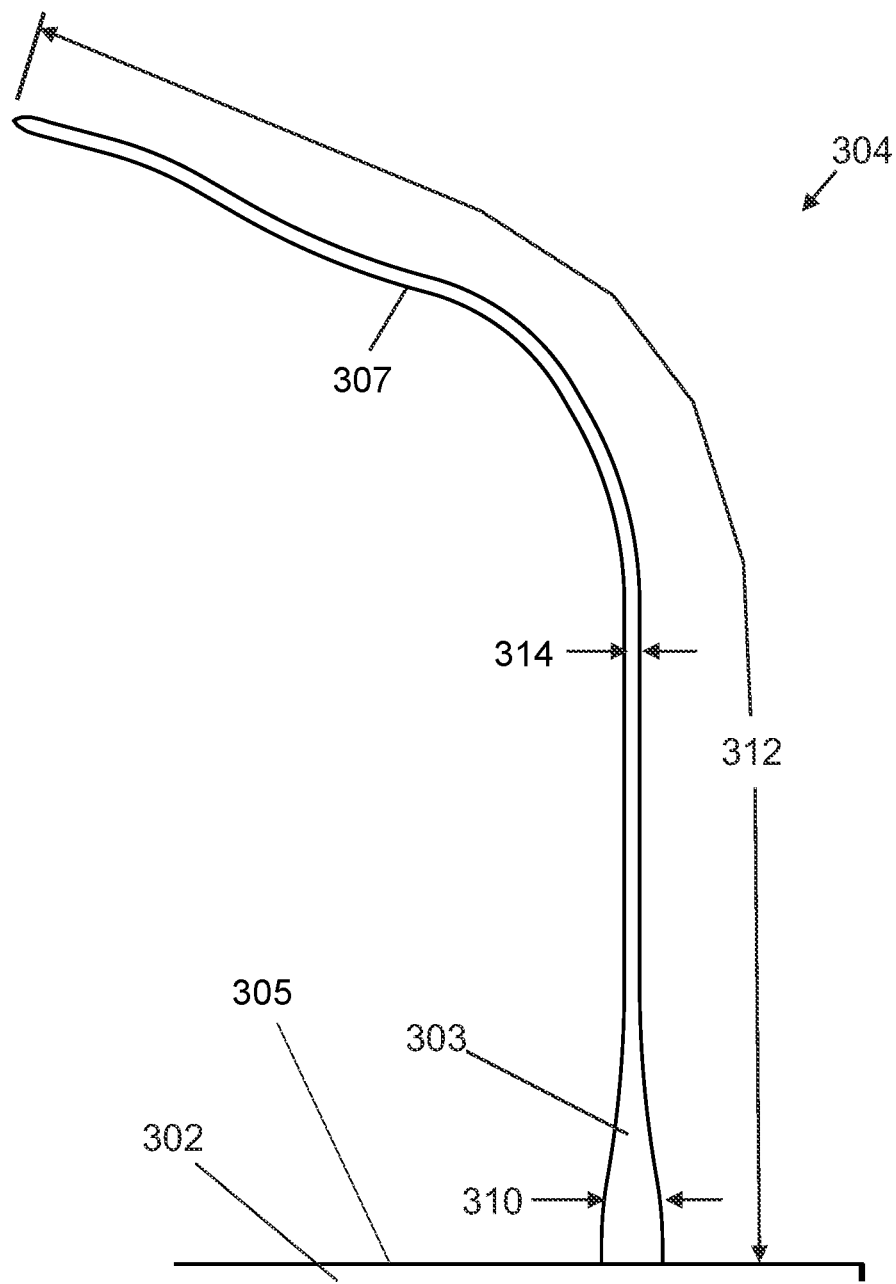
FIG. 9 depicts a second elongate nanofiber configuration that may be formed on a filter wrap of the present invention.

FIGS. 2 through 8 diagrammatically depict a segment of a film strip 200 for producing filter wraps of the present invention. Film strip 200 has a flexibly planar film portion 202 of thickness 203, with a first surface 205 on which are formed nanofibers 204 and a second surface 207. Nanofibers 204 have a length 212 and are spaced distance 206 apart in a first direction and distance 208 apart in a second direction perpendicular to the first direction. Referring now to FIG. 8, nanofibers 204 have a first diameter 210 near the base of fiber 204 and generally decrease in diameter toward the distal end of the fiber. As defined herein the term "nanofiber" refers to a fiber structure having a diameter of less than 1000 nanometers for more than half the length of the structure. In some embodiments, the nanofibers of filter media of the present invention may have a tapered base portion and a relatively longer fiber portion which extends from the base portion. Referring now to FIG. 9, nanofiber 304 has a tapered proximal base portion 303 of diameter 310 with elongate distal portion 307 of diameter 314 formed thereon, and a length 312. The nanofiber 304 is on surface 305 of planar film portion 302.

Film strip 200 is depicted with first distance 206 and second distance 208 between adjacent nanofibers 204 constant over surface 205. In other embodiments, either distance 206 or distance 208 or both may vary along surface 205 of film strip 200. Nanofibers 204 are shown in ordered parallel rows. In other embodiments other arrangements are used depending on the particular filtering process requirements. Similarly, height 212 and diameter 210 of nanofibers 204 are constant across the surface of strip 200. In other embodiments height 212 and diameter 210 of nanofibers on a first portion of surface 205 of film strip 200 may have first values, while on a second portion of surface 205, height 212 and diameter 210 may have second values.

The process used to produce nanoholes 106 in chill roll 102 uses the energy of a single laser pulse to vaporize material so as to form the nanohole. The vaporized material of chill roll 102 is expelled to form a nanohole 106. The process is well controlled within limits, however the precise geometry of a nanohole 106 is determined by the flow of superheated vaporized material at the site. Accordingly, there may be minor variations in the form of nanoholes 106, and in the nanofibers 204 that are molded therein. Also, nanofibers 204, particularly those with long tendrilous forms, may stretch somewhat during extraction from nanoholes 106. Therefore it will be understood that when it is stated that nanofibers 210 in an array have a height 212, height 212 is a nominal height, and individual fibers 204 may have a height that is somewhat greater or less than nominal height 212. Similarly, when considering diameters 210 of nanofibers 204, diameter 210 is a nominal value and there may be natural variations in the diameters 210 in nanofibers 204 within an array.

Nanofibers of the present invention may be broadly characterized by the ratio of their length (212 in FIGS. 8 and 312 in FIG. 9) to their average diameter. Typically nanofibers of filter media of the present invention have length to diameter ratios between 10:1 and 1,000:1. Nanofibers with length to diameter ratios at the lower end of the range may be used in applications in which the fibers require a degree of stiffness to optimally affect a fluid stream flowing thereby.

The nanofiber arrays formed on filter wraps of the present invention may form a tuned topography. That is, filter wraps may be optimally configured to remove specific contaminants such as pathogens, chemical contaminates, biological agents, and toxic or reactive compounds from a fluid to be filtered. By selecting specific values for longitudinal distance 206 and transverse distance 208 between adjacent nanofibers (FIGS. 2 through 6), and diameters 210 and 310, and lengths 212 and 312 of nanofibers 204 and 304 (FIGS. 8 and 9) filter media of the present invention may be formed with filter wraps on which nanofiber arrays are configured to preferentially remove a specific contaminant. Indeed, filtering devices may be formed in which filter media formed of filter wraps with a first nanofiber configuration optimal for removal of a first contaminant are combined with media formed of filter wraps with nanofiber arrays optimally configured to remove a second contaminant. Additional filter media of the present invention with tuned topographies for removing specific contaminants may be added to remove these substances from the flow stream.

Filter wraps of the present invention with tuned nanofiber arrays may be formed from virtually any polymeric material. These polymeric materials have inherent electrostatic properties and exert an electrostatic force at a point on the surface of an object formed therefrom that is inversely related to the radius of curvature of the surface at that point. As the radius of the surface at a given point is reduced, the electrostatic attractive force at that point increases. Accordingly, the electrostatic force exerted by a nanofiber is much greater than that exerted by a microfiber. This is of particular importance in filter applications in which contaminants smaller than the pore size of the filter must be removed from a fluid stream. Electrostatic forces draw contaminants to fibers for removal from the fluid stream. As the diameter of the fibers is decreased, the electrostatic force exerted by the fibers increases. The attractive force of a nanofiber is generally orders of magnitude greater than that of a microfiber, and therein lies the incentive for creating nanofiber filters. The high level of electrostatic force exerted by nanofibers allows them to efficiently remove contaminants from a fluid stream.

Figure 10:
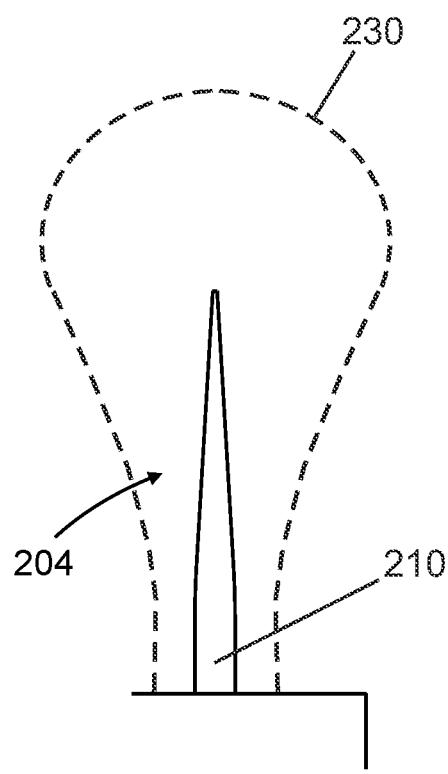
FIG. 10 depicts the electrostatic field surrounding a nanofiber of FIG. 8.
Figure 11:
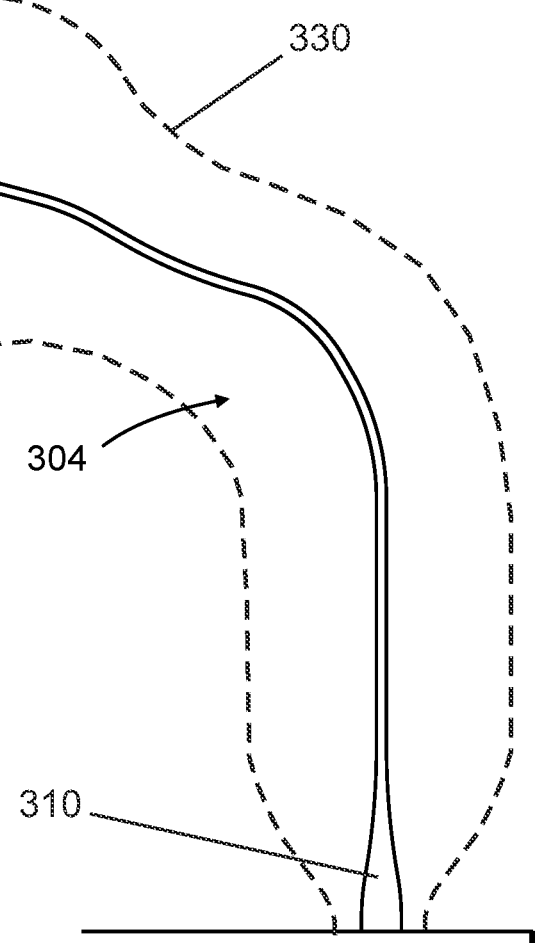
FIG. 11 depicts the electrostatic field surrounding the nanofiber of FIG. 9.
Figure 12:
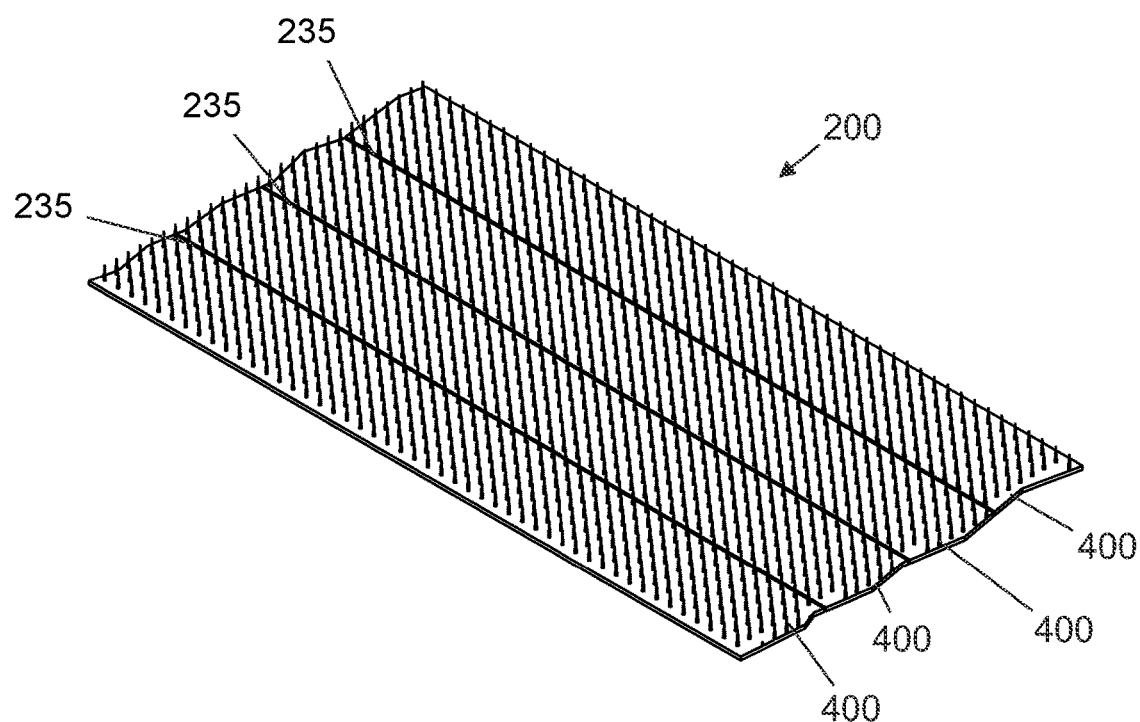
FIG. 12 is a perspective of the film strip of FIG. 2 with elongate cuts formed therein to form elongate filter wraps of the present invention.
Figure 13:
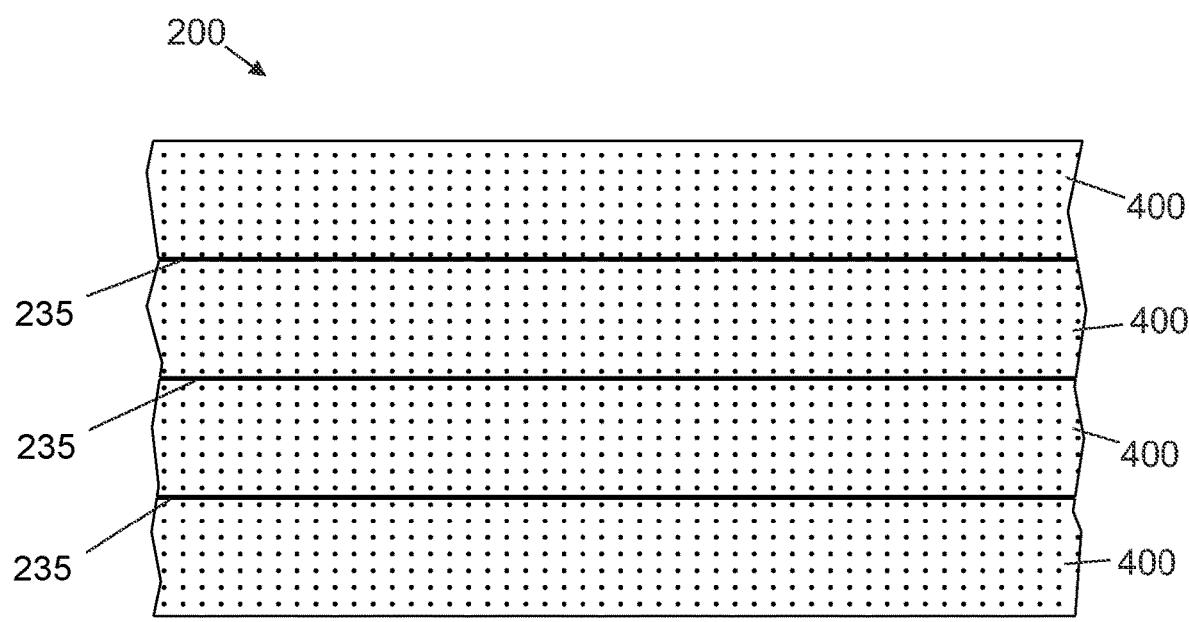
FIG. 13 is a plan view of the objects of FIG. 12.
Figure 14:
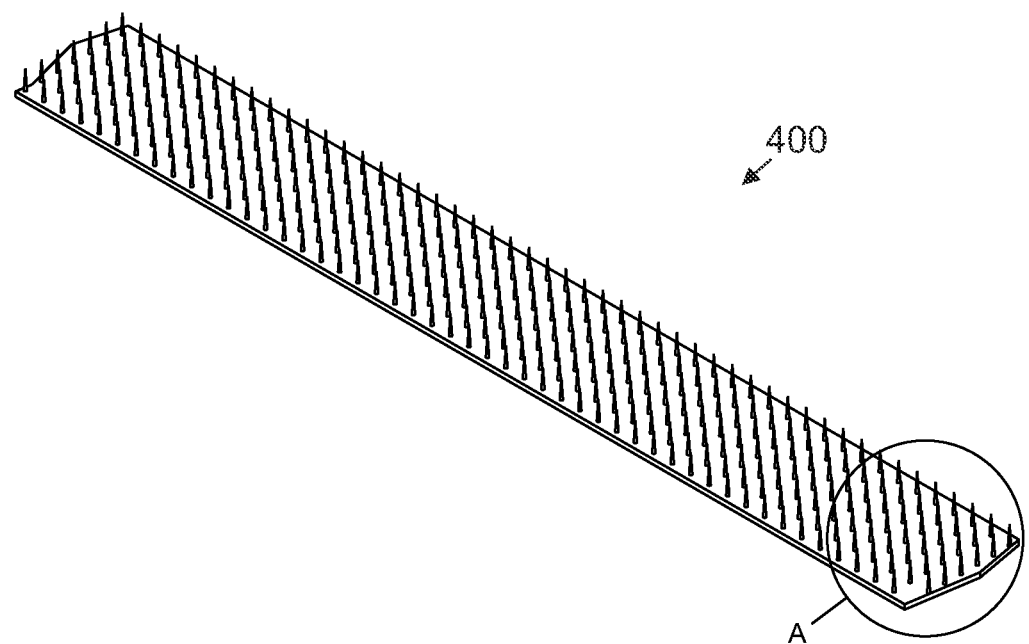
FIG. 14 is a perspective view of a filter wrap of the present invention.
Figure 15:
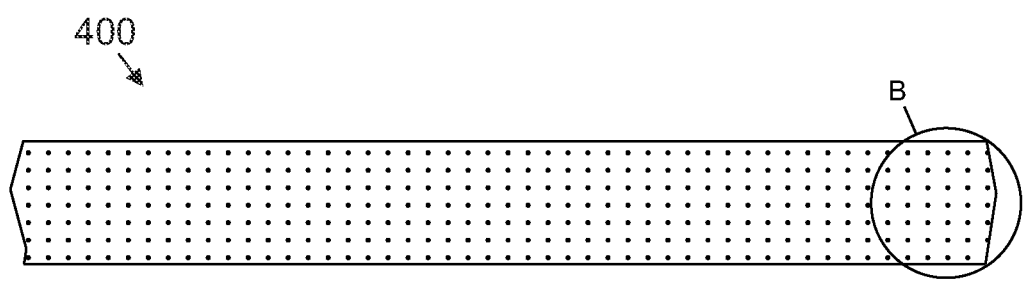
FIG. 15 is a plan view of the objects of FIG. 14.
Figure 16:
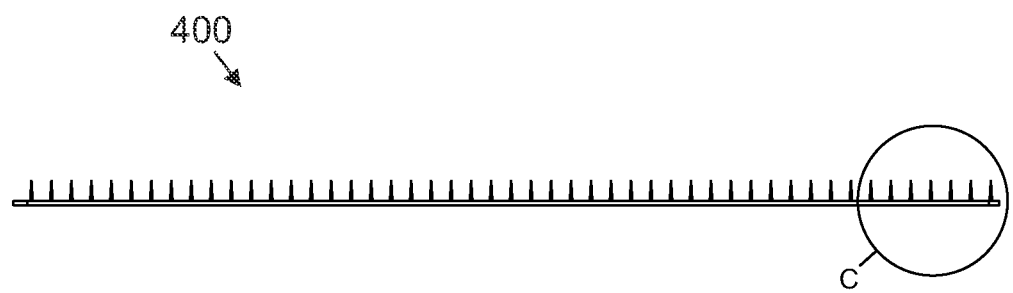
FIG. 16 is a side elevational view of the objects of FIG. 14.
Figure 17:
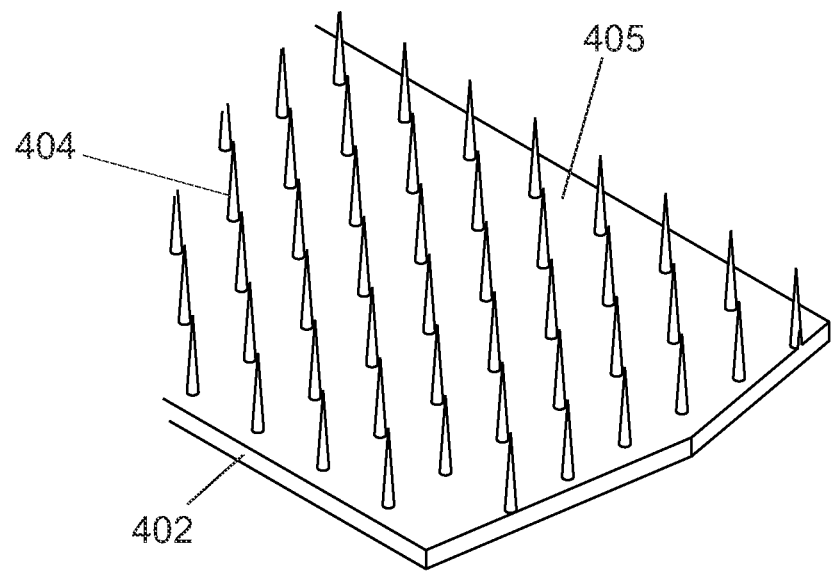
FIG. 17 is an expanded view of the objects of FIG. 14 at location A.
Figure 18:
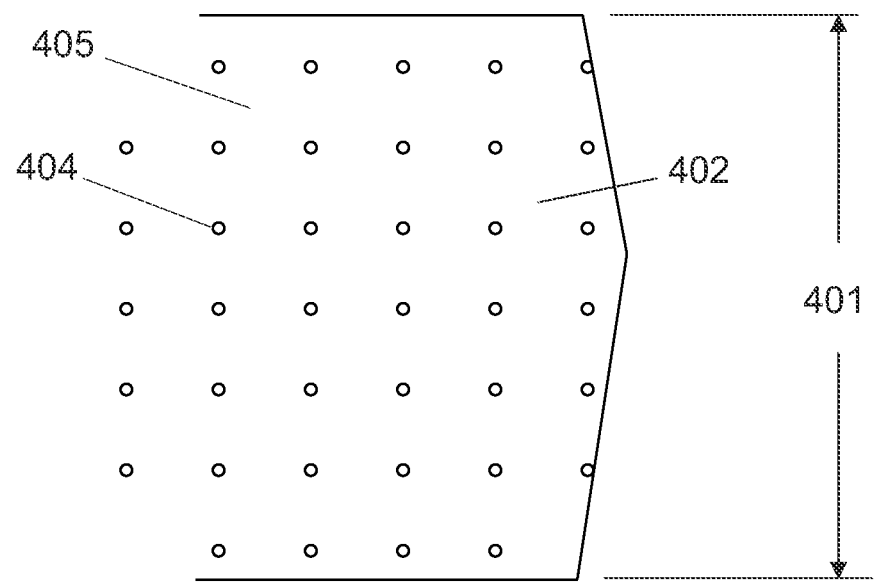
FIG. 18 is an expanded view of the objects of FIG. 15 at location B.
Figure 19:
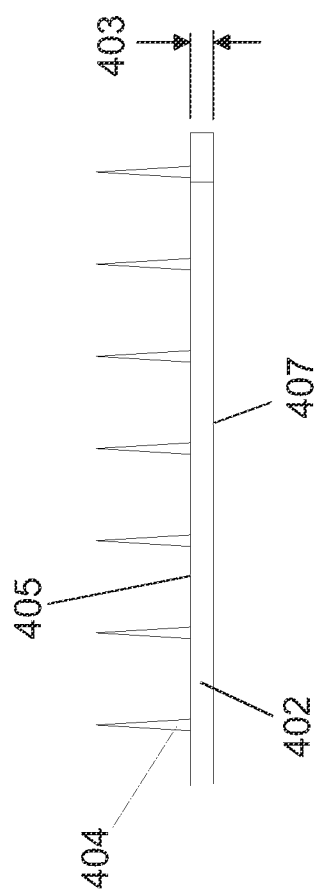
FIG. 19 is an expanded view of the objects of FIG. 16 at location C.

FIGS. 10 and 11 depict field lines 230 and 330 indicating the intensity of an electrostatic force field line surrounding nanofibers 204 and 304 respectively. As described previously, the field intensity at a point on the surface of a fiber is inversely proportional to the radius of curvature of the fiber at that point. This is reflected in the field line depicted. It should be noted that the field intensity is maximal at the distal end of the fibers. In prior art nanofiber filter media formed by electrospinning or other conventional methods the nanofibers are virtually continuous with length to diameter ratios ranging from 1,000,000:1 to 100,000,000:1. Accordingly, for a given cumulative nanofiber length, fibers of the present invention will have from about ten to about one thousand times as many fiber ends. The associated higher electrostatic potential of nanofiber media formed in accordance with the present invention allows the construction of filters with efficiencies not attainable using nanofibers formed by electrospinning or other conventional methods.

The arrangement of nanofibers in an array can impact filtration specificity and efficiency by modulating the strong gradients in the electrical and chemical potential fields of normally highly reactive sub-micron length scale structures. Control of these gradients at process length scales can enhance efficiency of transport or flow. However, if two nanofibers are in close proximity and the potential fields overlap, then the gradient of the potential field is reduced and the advantages of the nanoscale topography are reduced. The arrangement of nanofibers in a nanofiber array of the proper scale and spacing will preserve the separation of nanofibers thus optimizing the potential field gradient.

An electrostatic charge may be imparted to the filter media of the present invention to increase the attractive force of the nanofiber arrays formed on filter wraps and filter media formed therefrom. Filter wraps of the present invention may be formed from a polymer or polymer blend with suitable electret properties. Among these materials are polypropylene, poly(phenylene ether) and polystyrene. In certain embodiments these filter wraps may have a lamellar construction that has a first layer formed of an electret material on which are formed nanofiber arrays of the present invention, and a second layer bonded thereto with desirable physical and/or electrical properties. The materials selected for each layer may be optimized for a specific filtering application. Charging of the media may be accomplished by corona discharge, triboelectrification, polarization, induction, or another suitable method. Over time the imparted electrostatic charge may be dissipated by particle loading, and/or by quiescent or thermal stimulation decay.

Referring now to FIGS. 12 through 19, slits 235 are formed in film strip 200 to produce filter wraps 400. Strips 400 have a predetermined width 401. In some embodiments, the ratio of width 401 of filter wrap 400 to the thickness 403 of film portion 402 is between 20:1 and 100:1. In others, the ratio of width 401 to thickness 403 is between 100:1 and 500:1. In still others, the ratio of width 401 to thickness 403 is between 500:1 and 3,000:1. The ratio of the length of filter wrap 400 to width 401 of that filter wrap in some embodiments is between 10:1 and 100:1. In others, the ratio is between 100:1 and 1,000:1. And in still others, the ratio of the length of filter wrap 400 to width 401 of filter wrap 400 is greater than 1,000:1.

Filter media of the present invention are formed by wrapping or folding filter wraps so as to form interlayer spaces that function as flow paths. Fluid flowing through the interlayer spaces passes in close proximity to nanofiber arrays formed on a surface of the filter wrap.

Figure 23:
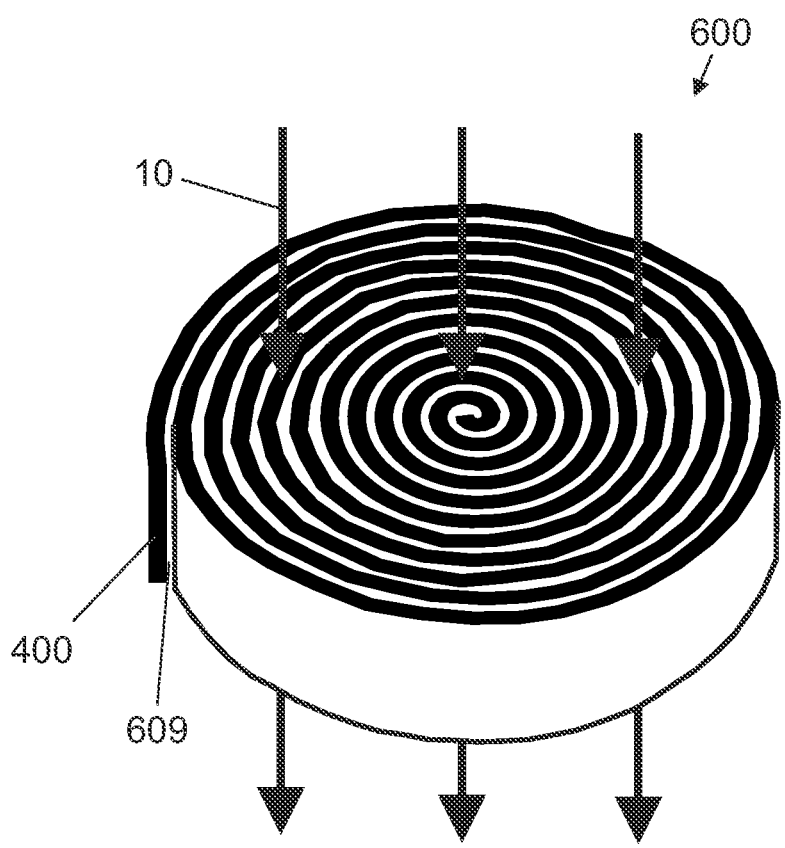
FIG. 23 is a perspective view of the filter element of FIG. 20 depicting fluid flow (indicated by arrows) through the filter element perpendicular to the basal plane.
Figure 24:
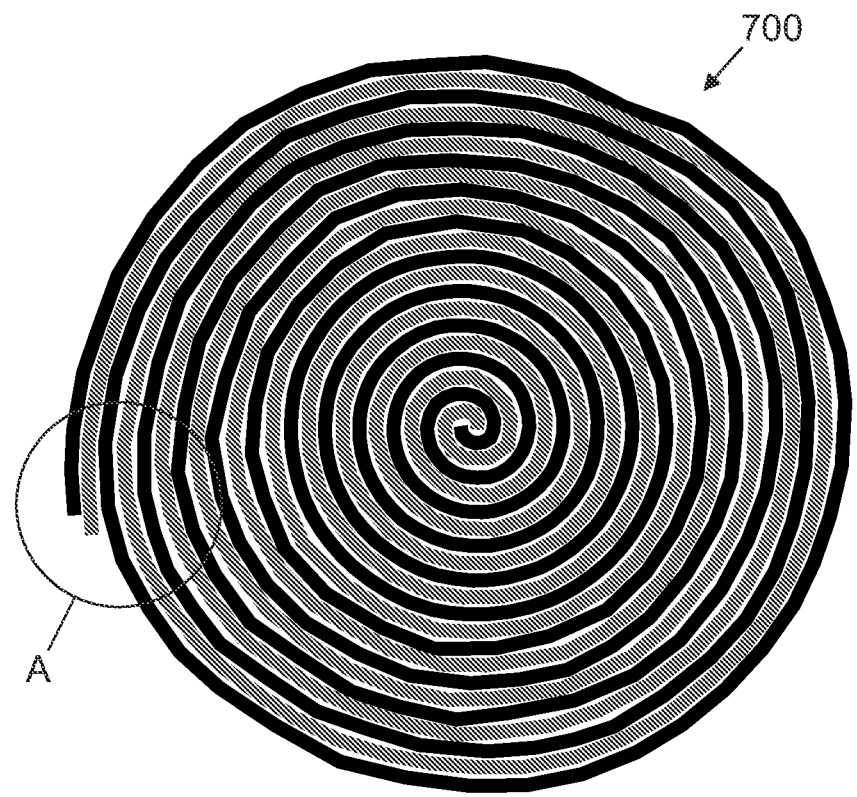
FIG. 24 is a plan view of a second exemplary embodiment of a filter element of the present invention showing two polymer films spiral wound together.
Figure 25:
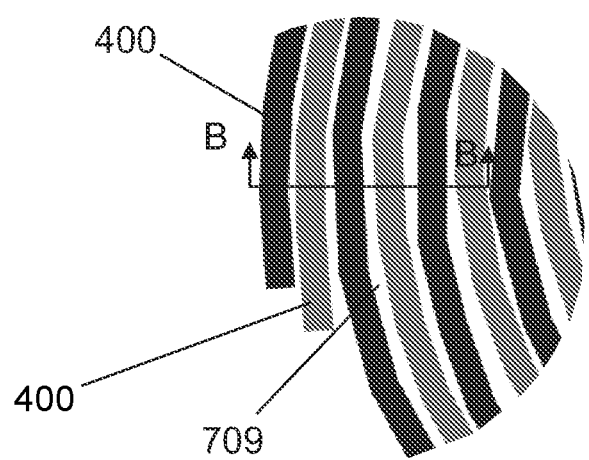
FIG. 25 is an expanded view of the objects of FIG. 24 at location A.
Figure 26A:
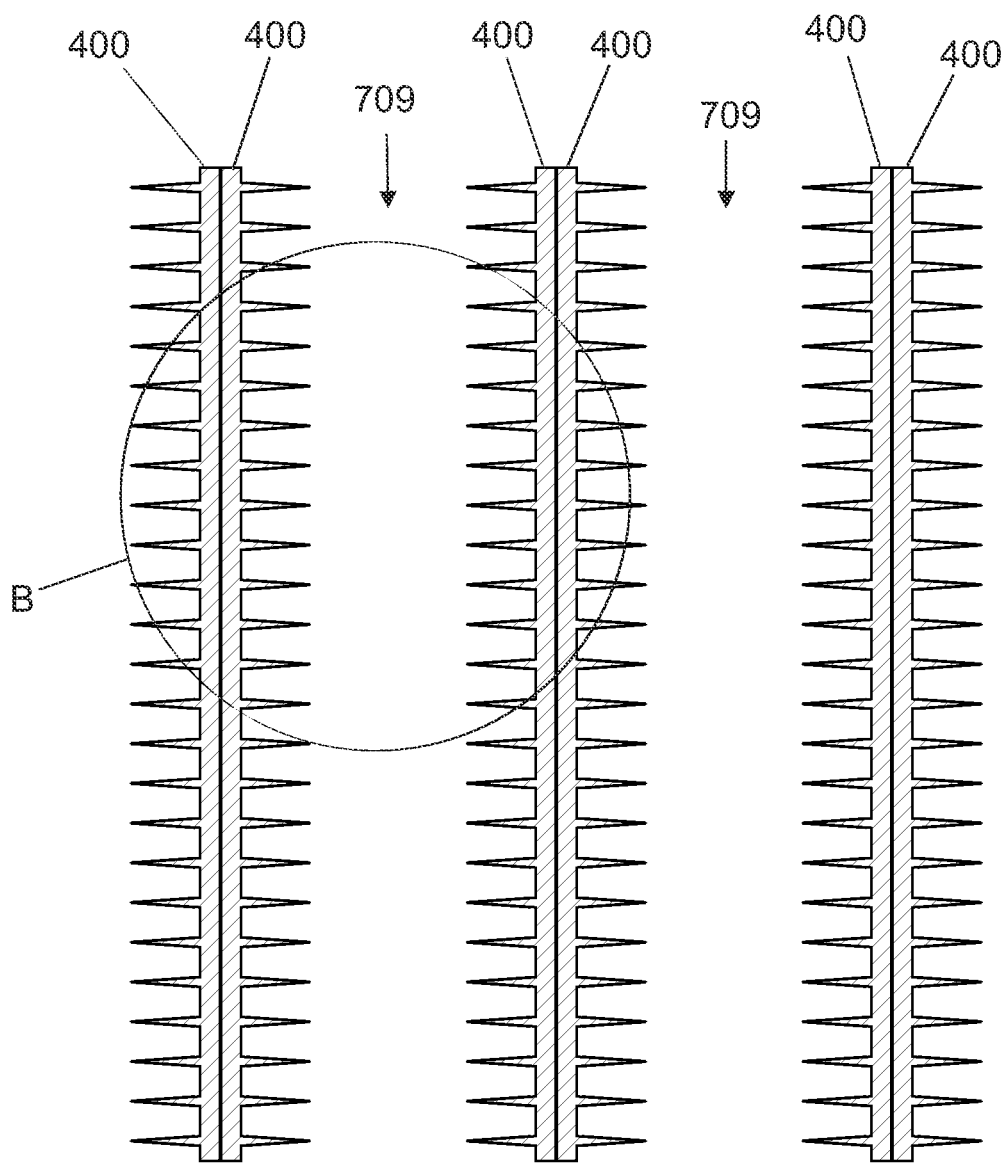
FIG. 26A is an expanded sectional view of the objects of FIG. 25 at location B-B.
Figure 26B:
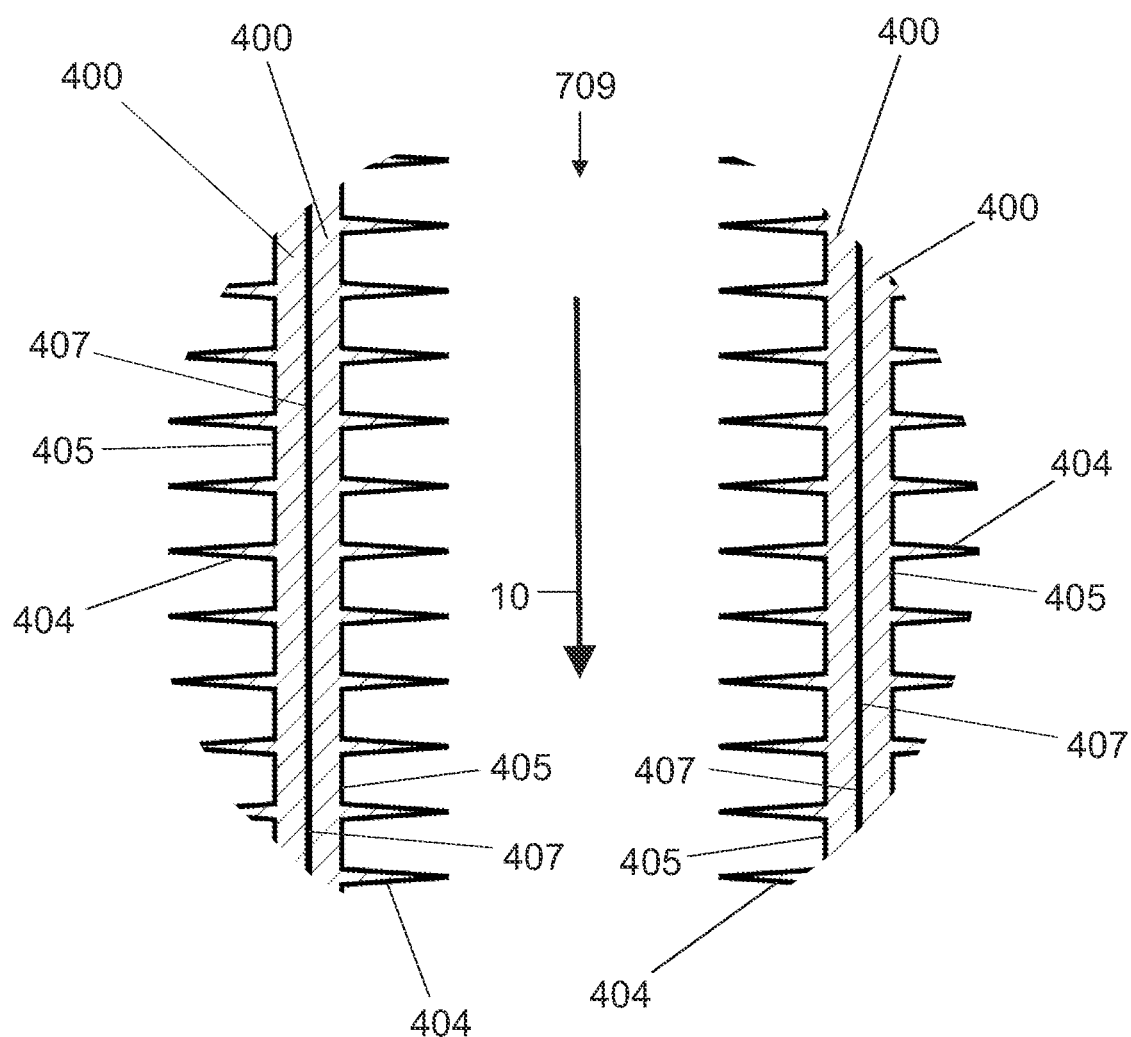
FIG. 26B is an expanded view of the objects of FIG. 26A at location B showing the first surface of the first film on which is formed an array of nanofibers facing the first surface of the second film on which is formed an array of nanofibers.

FIGS. 20 through 23 depict filter element 600 of the present invention having a spiral wound configuration. Filter element 600 has inter-layer space 609 formed between adjacent wound layers of wrap 400, and a basal plane 602 formed by the bottom edge of the wound layers of wrap 400. The top edge of the wound layers of wrap 400 form another plane parallel to basal plane 602. As best seen in FIGS. 21A and 21B, interlayer space 609 bound on one side by first surface 405 of film portion 402 of layer 400 with nanofibers 404 formed thereon, and second surface 407 of film portion 402. As depicted in FIG. 21B, the first surface 405 faces an adjacent portion of the second surface 407. Indeed, wrap 400 is spiral wound about itself such that substantially all of the first surface 405 faces substantially all of the second surface 407. As depicted in FIG. 23, flow through filter element 600 is normal to basal plane 602 through interlayer space 609 and parallel to the first surface 405 of the wrap 400 on which nanofibers 404 are formed, thereby exposing fluid 10 to arrays of nanofibers 404. Electrostatic forces of these nanofiber arrays capture contaminants that come into sufficiently close proximity to the nanofibers and their associated electrostatic fields. In this way, a contaminant contained in the fluid can be at least partially filtered from the fluid.

FIGS. 24 through 26B depicted an alternate embodiment filter element 700 of the present invention in which two filter wraps 400 are spiral wound together, the second surfaces 407 of the film portions 402 of the wraps being in intimate contact (and optionally, affixed together) and the first surfaces 405 of the wraps facing each other. Interlayer gaps 709 are bound on both sides by first surfaces 405 of filter wraps 400 with nanofibers 404 formed thereon. Accordingly, filter element 700 has increased filtering efficiency compared to filter element 600 with no increase in back pressure. Filter element 700 is formed of two identical wraps 400. In other embodiments a filter element constructed like element 700 is formed with two dissimilar wraps positioned with their film portions in intimate contact. A first wrap may have nanofiber arrays optimized for removing a first contaminant from the flow stream while a second wrap may have nanofiber arrays optimized for removing a second contaminant.

Figure 27:
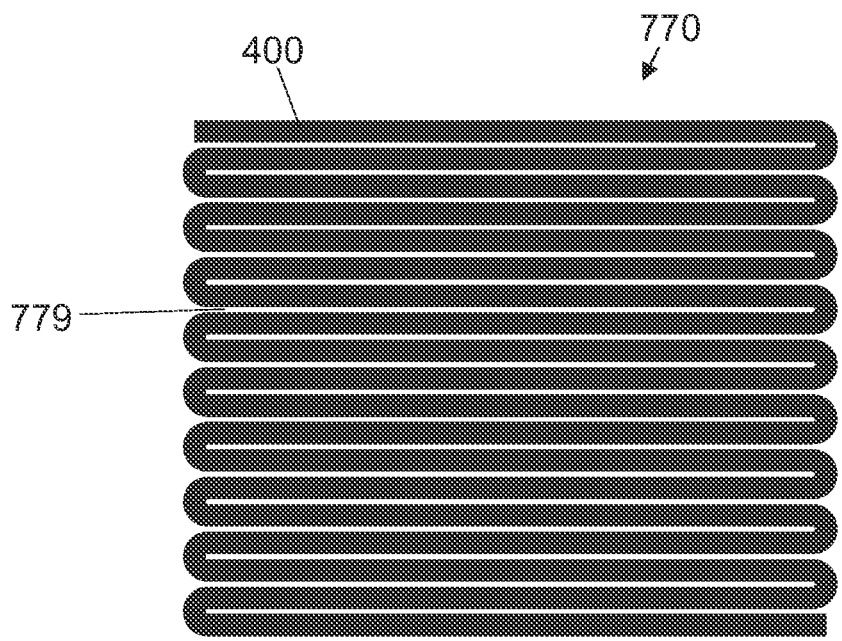
FIG. 27 is a plan view of a third exemplary embodiment of a filter element of the present invention wherein the polymer film is folded back and forth on itself such that no portion one surface faces any portion of the other surface.
Figure 28:
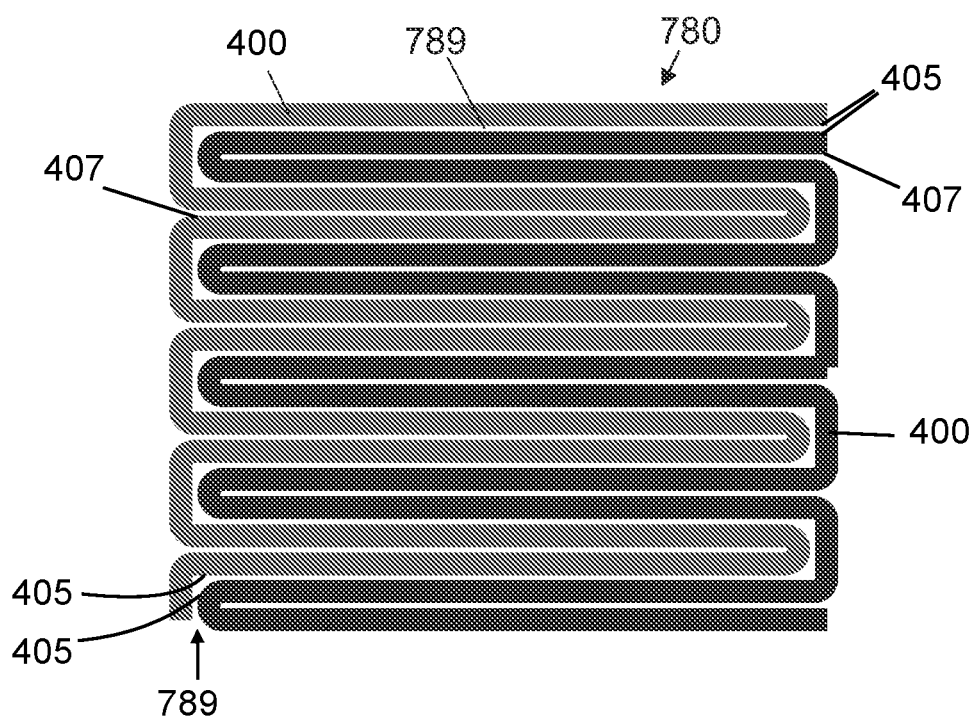
FIG. 28 is a plan view of a fourth exemplary embodiment of a filter element of the present invention wherein two films are interfolded.

In other filter element constructs of the present invention filter wrap 400 is not wound to create the element, but rather folded. For example, FIG. 27 depicts filter element 770 formed by folding a single wrap 400 back and forth on itself to form multiple overlapping layers such that no portion of one surface faces any portion of the other surface. FIG. 28 depicts filter element 780 formed using two wraps 400 interfolded with second surfaces 407 of the wraps 400 adjacently positioned as previously depicted in FIGS. 26A and 26B. The nanofiber-bearing first surfaces 405 of the wraps 400 each of filter element 770 and filter element 780 define interlayer spaces or gaps 779 and 789, respectively, as previously described.

In filter elements of the present invention previously herein described the elements are either wrapped or folded. In other embodiments of the present invention portions of the filter element have first portions that are wound, and other portions that are folded. Indeed, to suit external shape constraints, elements may incorporate multiple folded and wrapped regions with each region being formed of its own wraps 400. Any filter construct in which elongate filter wraps of the present invention are wrapped or folded on themselves so as to create a basal plane which contains one edge of the wrap(s), and to create interlayer spaces or gaps perpendicular to that plane in which at least one wall surface has nanofibers formed thereon to remove contaminants from a fluid stream falls within the scope of this invention.

Figure 29:
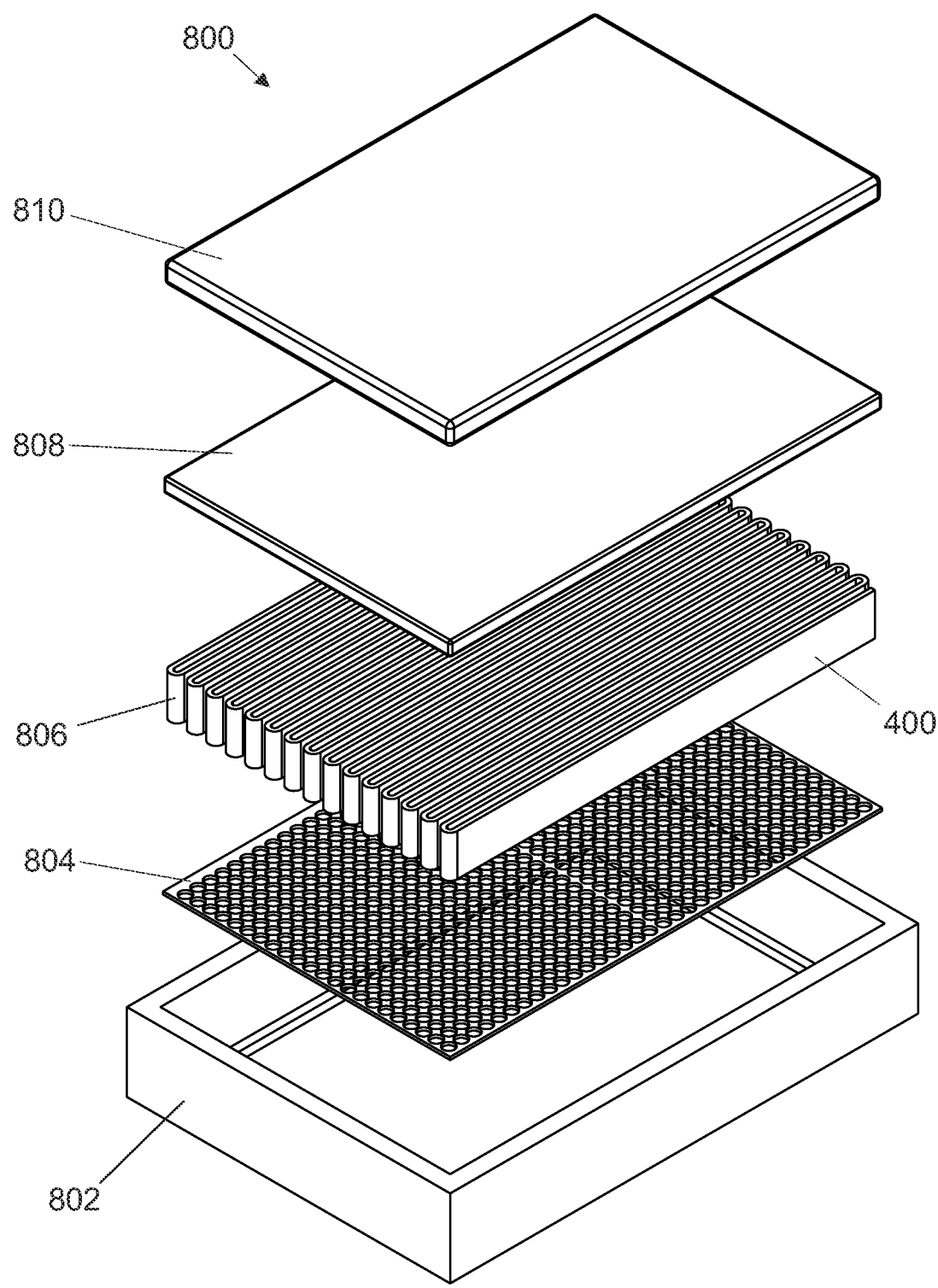
FIG. 29 is a perspective exploded view of a filter assembly comprising a filter element formed of filter wraps in accordance with principles of the present invention.
Figure 30:
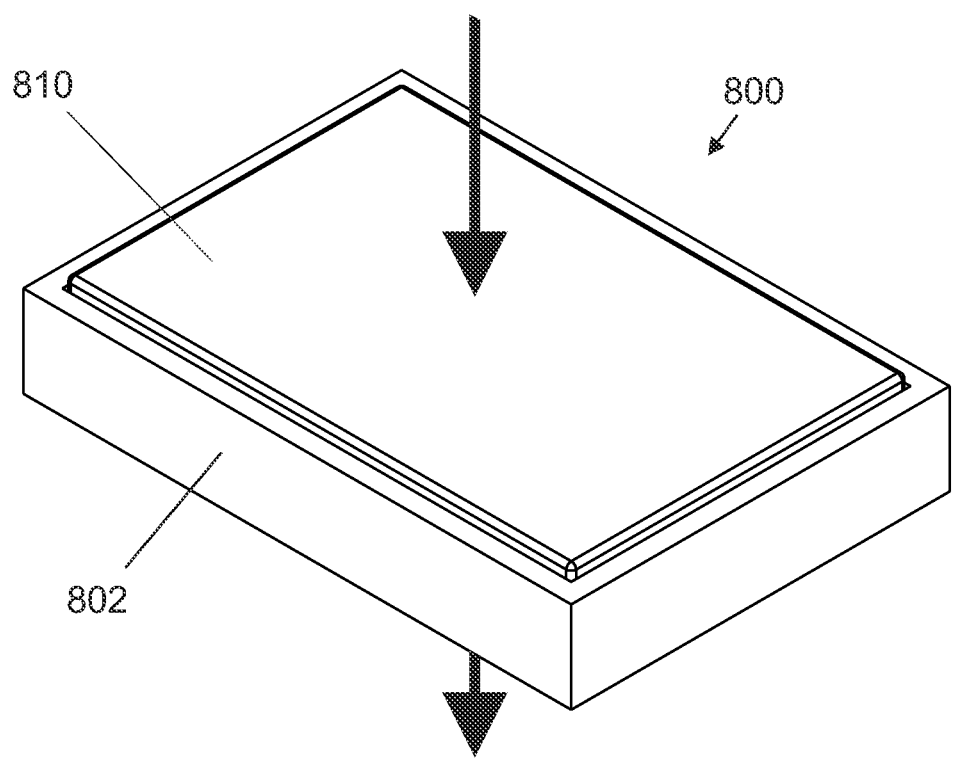
FIG. 30 is an upper perspective view of the objects of FIG. 29 showing the filter assembly in an assembled configuration with the direction of fluid flow indicated by arrows.
Figure 31:
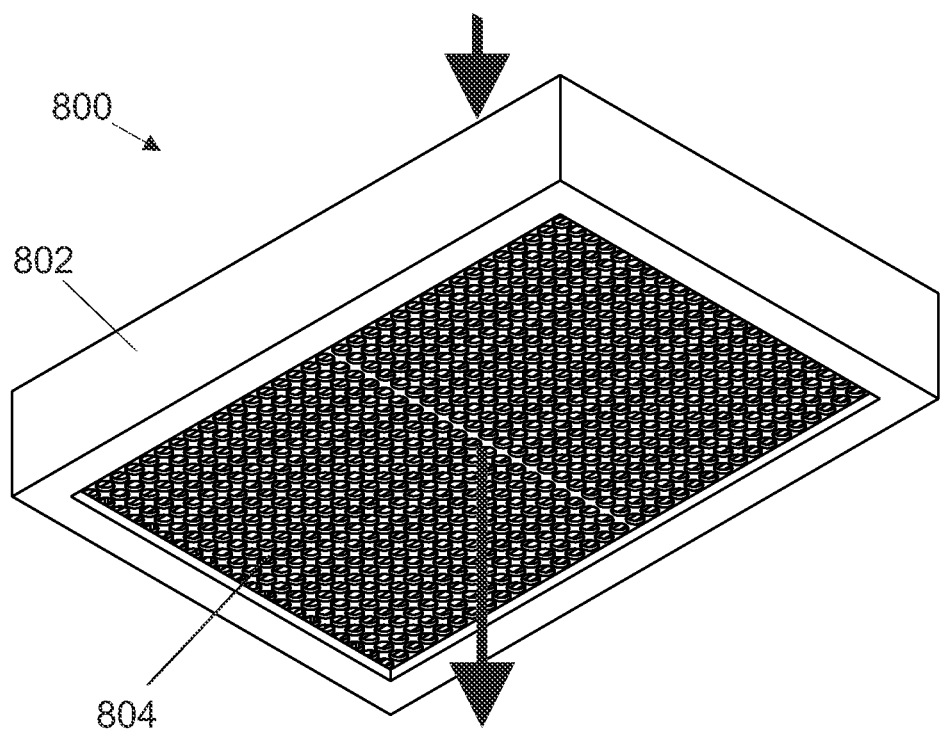
FIG. 31 is a lower perspective view of the objects of FIG. 30 with the direction of fluid flow indicated by arrows.
Figure 32:
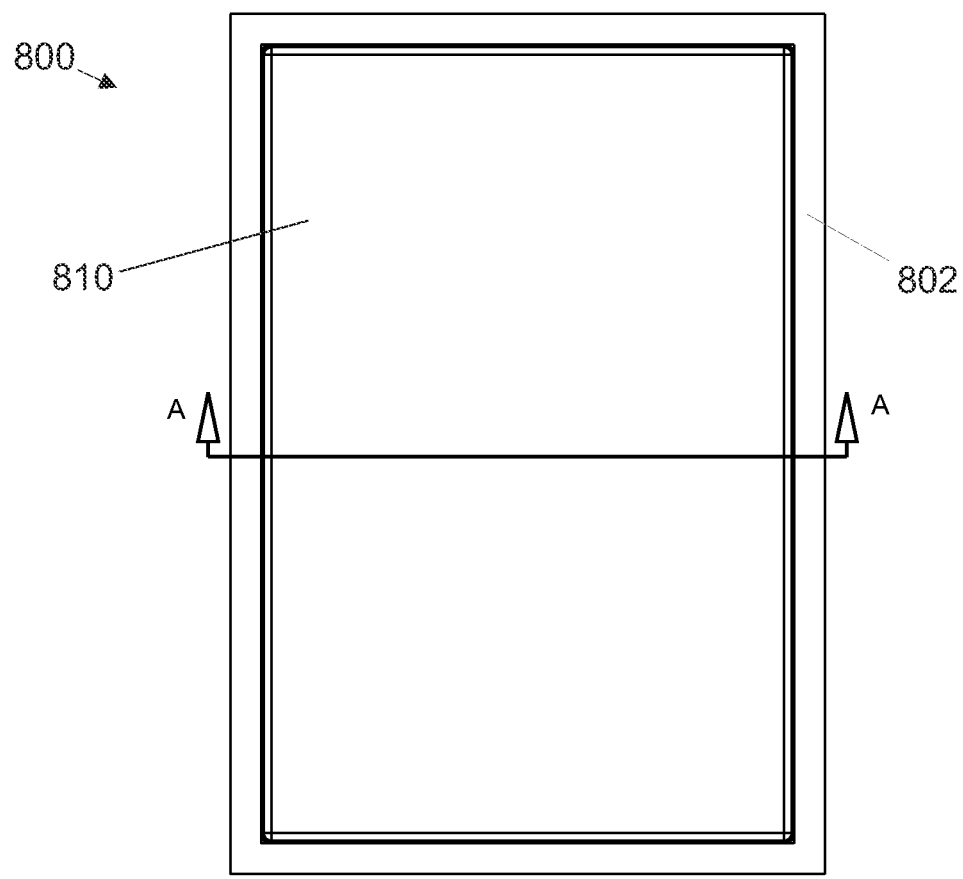
FIG. 32 is a plan view of the objects of FIG. 30.

Filter media of the present invention may be incorporated in filter assemblies that comprise multiple filter elements. Referring now to FIG. 29 depicting filter assembly 800, first filter element 810 is a conventional, prior art filter element configured to remove large contaminant particles from the fluid stream. Second filter element 808 is also a prior art conventional filter element configured to remove smaller contaminant particles from the fluid stream. Filter element 806 is formed of filter wraps 400 in accordance with principles of the present invention configured for the removal of very small contaminant particles. Screen 804 may be formed of metal or polymer with multiple perforations so as to minimally affect fluid flow through filter assembly 800. Enclosure 802 contains the filter elements and screen as depicted in FIGS. 30 through 34. Fluid flow through filter assembly 800 is as depicted by arrows in FIG. 33, that is, through first element 810 wherein coarse particulate is removed from the fluid stream, then through second element 808 wherein finer particulate is removed, and then through inter-layer spaces 809 formed by wrap 400 wherein fine particulate is removed, and subsequently exits via screen 804.

Figure 20:
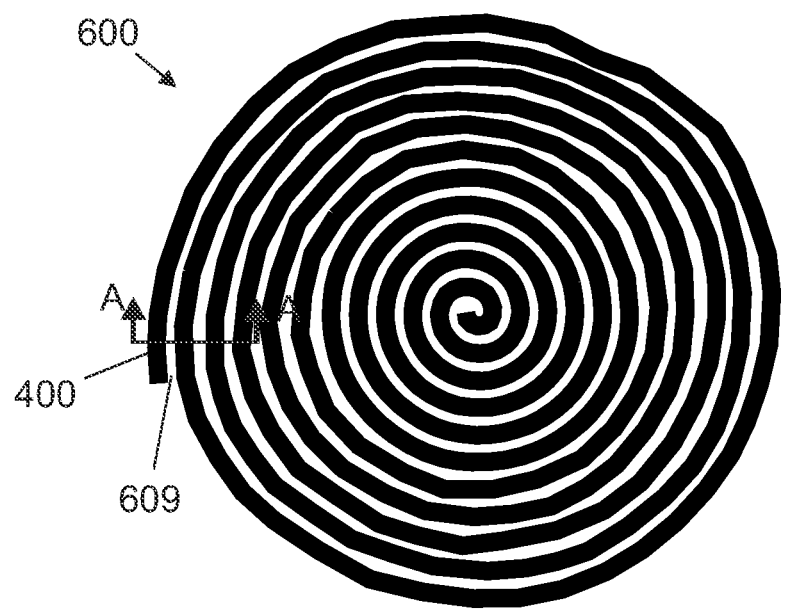
FIG. 20 is a plan view of a first exemplary embodiment of a filter element of the present invention wherein the polymer film is spiral wound about itself.
Figure 21A:
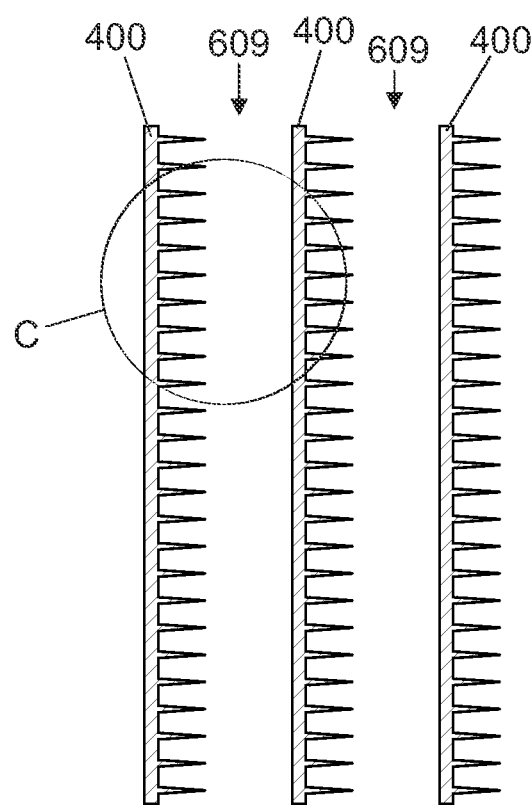
FIG. 21A is an expanded sectional view of the objects of FIG. 20 at location A-A.
Figure 21B:
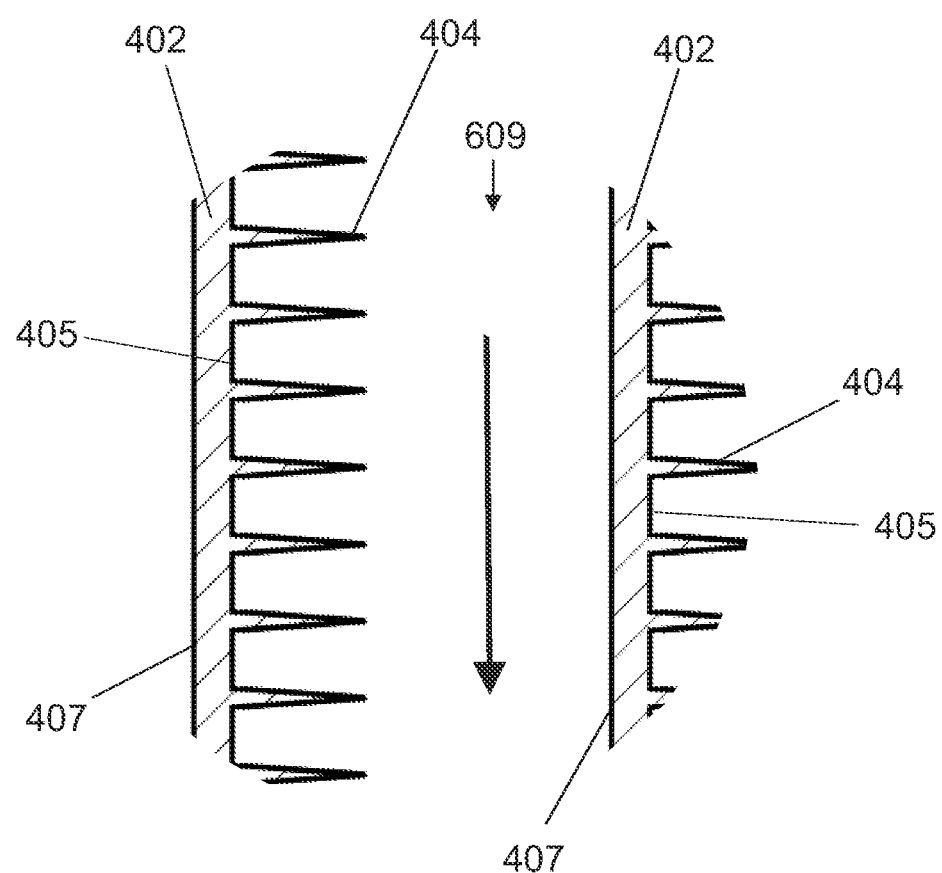
FIG. 21B is an expanded view of the objects of FIG. 21A at location C showing the first surface of the film on which is formed an array of nanofibers facing the second surface of the film on which there is are nanofibers.
Figure 33:
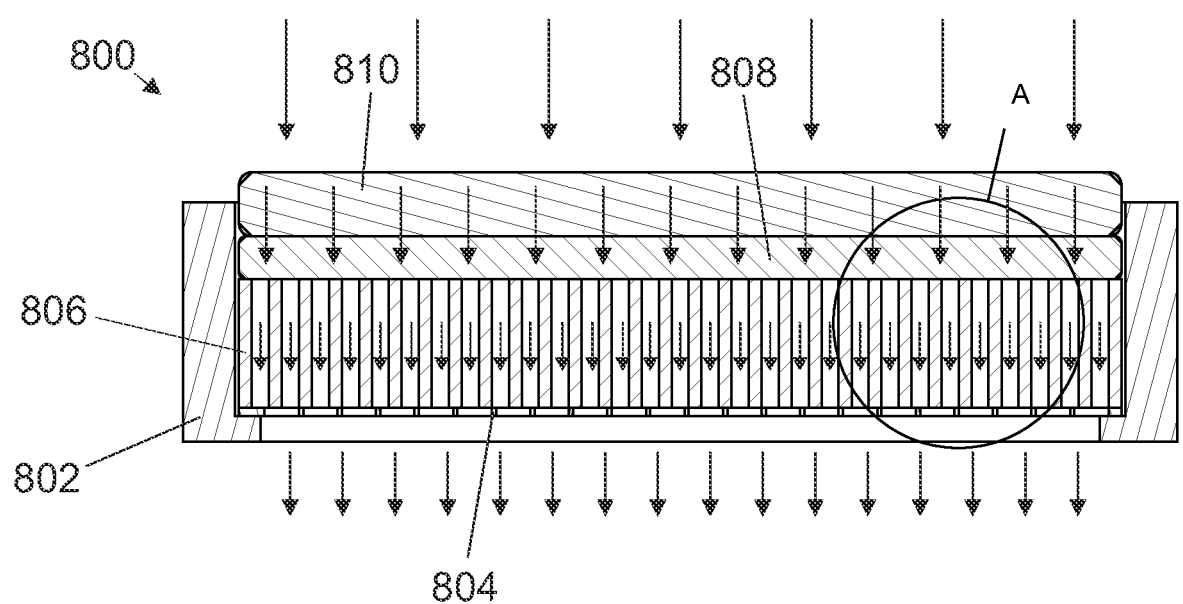
FIG. 33 is a sectional view of the objects of FIG. 32 at location A-A.
Figure 34:
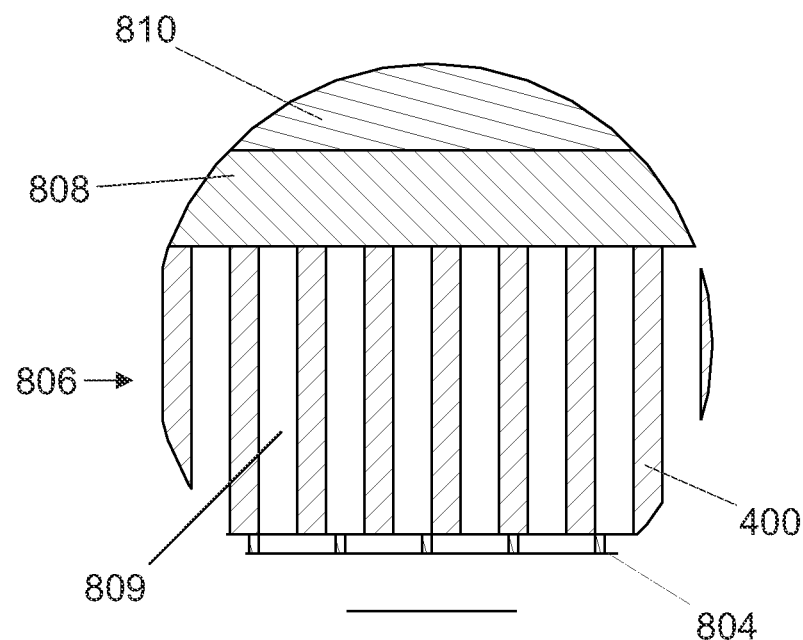
FIG. 34 is an expanded sectional view of the objects of FIG. 33 at location A.

As previously described herein, in prior art filter elements containing nanofibers the nanofibers are formed into a thin mat of long randomly oriented fibers. This form makes the filters susceptible to clogging. As seen in FIGS. 33 and 34, the fluid flow passages of filter element 806 formed by inter-layer spaces 809 with nanofibers formed on at least one wall surface thereof allow unobstructed flow past the nanofibers so as to bring contaminants from the pre-filtered stream within capture distance of the nanofibers. This construction provides not only highly efficient filtering of extremely small contaminant particles, but also reduced clogging compared to prior art nanofiber-containing filter elements. Referring also to FIGS. 20 through 21B in which interlayer space 609 is analogous to interlayer space 809, nanofibers 404 formed on first surface 405 of filter wrap 400 are integral with planar portion 402 and therefore cannot be displaced and ejected from element 806. This is in contrast to prior art filter elements containing nanofiber mats wherein long, randomly oriented nanofibers are not bonded to each other or a substrate, and may become dislodged or fractured allowing nanofiber portions to be ejected from a filter element.

Assembly 800 contains a single filter element 806 formed in accordance with the principles of the present invention. In other embodiments, filter assemblies may contain two or more filter elements 806 stacked upon one another, each element 806 being optimized for the removal of a specific contaminant or collection of contaminants.

Figure 35:
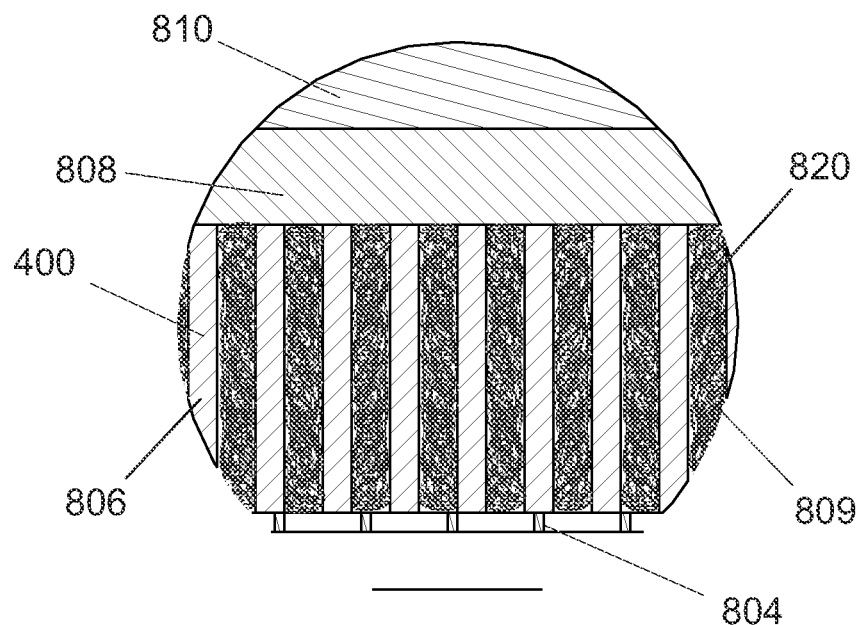
FIG. 35 depicts the objects of FIG. 34 with an additional turbulence-creating media added to create an alternate embodiment filter assembly of the present invention.

FIG. 35 is a sectional view of an alternate embodiment filter assembly identical to filter assembly 800 in all aspects of form and function except as subsequently herein described. In this embodiment inter-layer spaces 809 of filter element 806 are filled with filter media 820. In some embodiments filter media 820 may be a non-woven fabric or mat. In some embodiments filter media 820 is configured to create turbulence in fluid passing through inter-layer spaces 809. In some preferred embodiments, filter media 820 is a non-woven mat of elongate filter ribbons ("bioribbons") as described in U.S. Pat. No. 11,014,029, and optionally, nanofiber arrays on these bioribbons may be configured to optimally remove a specific contaminant. In some of these embodiments the media 820 is composed of short bioribbon segments. In still other embodiments media 820 may be activated charcoal or diatomaceous earth.

To summarize, filter elements of the present invention formed of one or more nanofiber-bearing elongate filter wraps that are wrapped or folded with interlayer spaces perpendicular to a basal plane formed therein so as to provide a fluid path through the interlayer spaces fall within the scope of this invention, and may optionally have filter media of a second type positioned within the inter-layer spaces. This second media type may have a variety of forms and characteristics. It may be configured to enhance filtering efficiency through the creation of turbulence to bring more particulate within the capture range of the nanofiber arrays on the filter wraps. The second media type may contain nanofiber arrays configured for the optimal removal of a specific contaminant. The second media may be a mat formed of elongate film elements or elongate fibers. Alternatively, it may be formed of multiple discrete elements of short length compressed within the inter-layer space. All fall within the scope of this invention.

Figure 36:
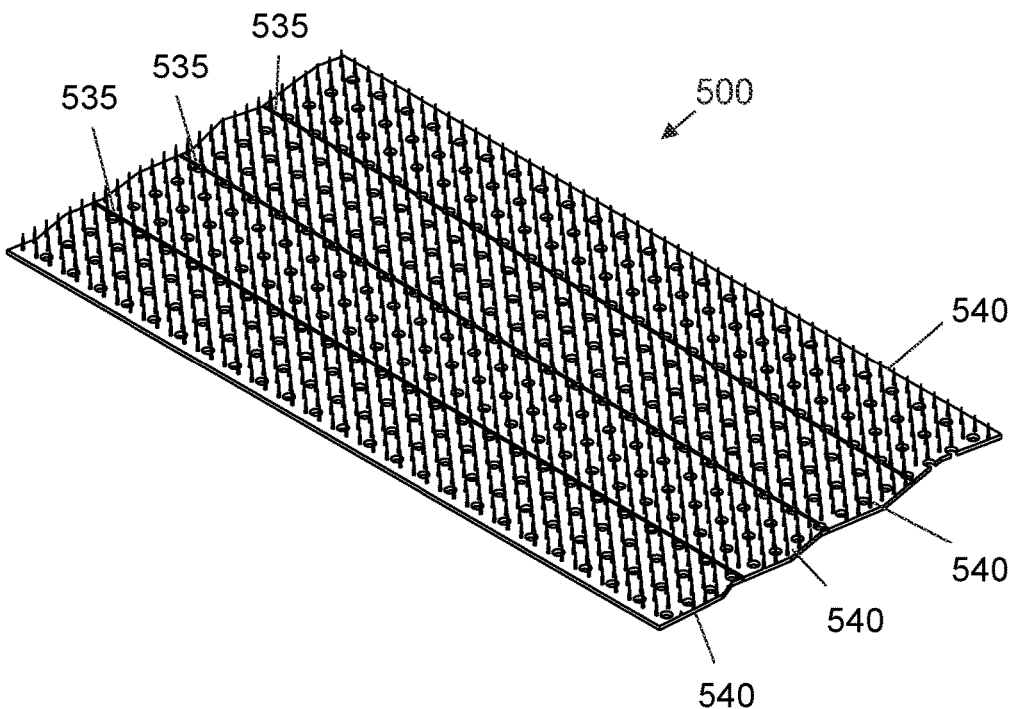
FIG. 36 is a perspective view of a film strip with perforations formed therein and with elongate cuts formed therein to form alternate embodiment filter wraps of the present invention.
Figure 37:
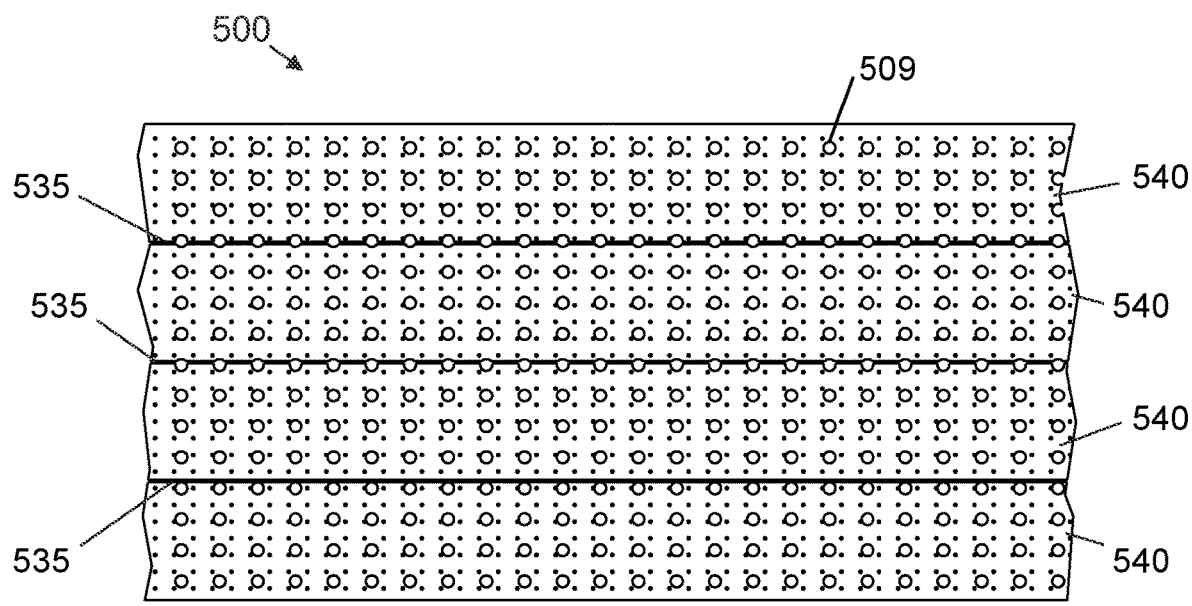
FIG. 37 is a plan view of the objects of FIG. 36.
Figure 38:
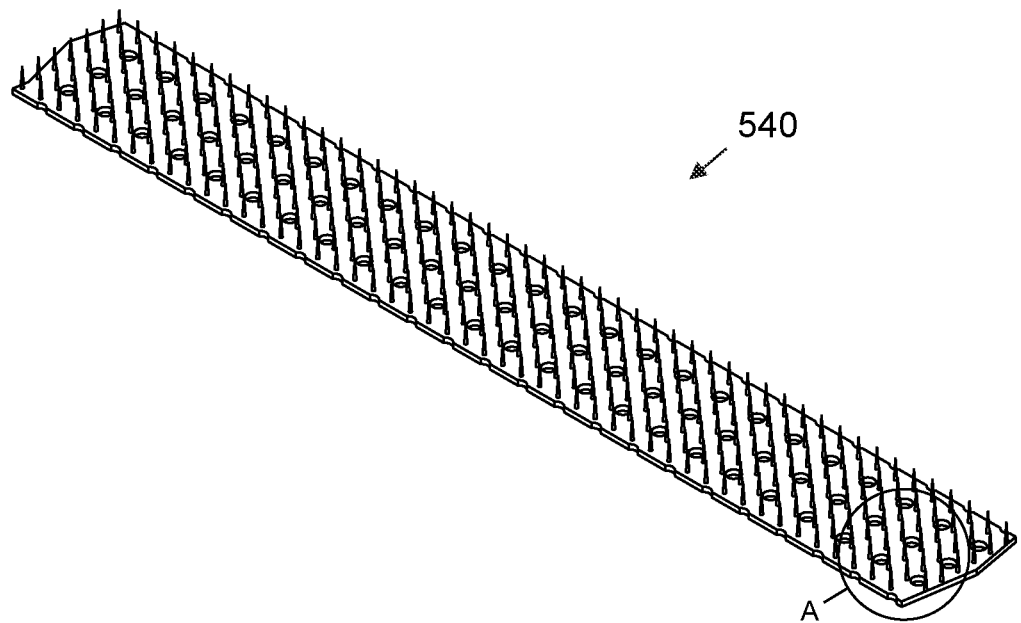
FIG. 38 is a perspective view of an alternate embodiment, perforated filter wrap of the present invention.
Figure 39:
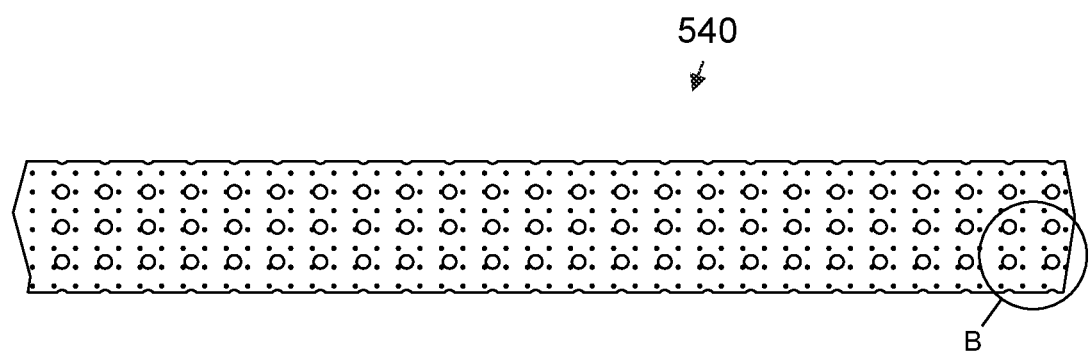
FIG. 39 is a plan view of the objects of FIG. 38.
Figure 40:
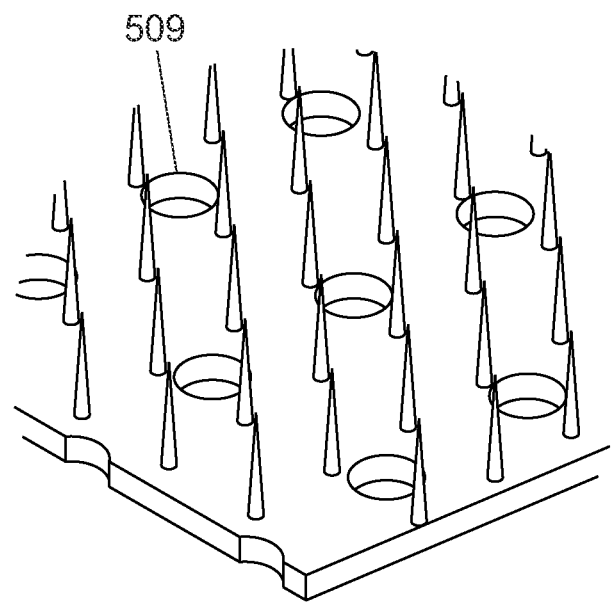
FIG. 40 is an expanded view of the objects of FIG. 38 at location A.
Figure 41:
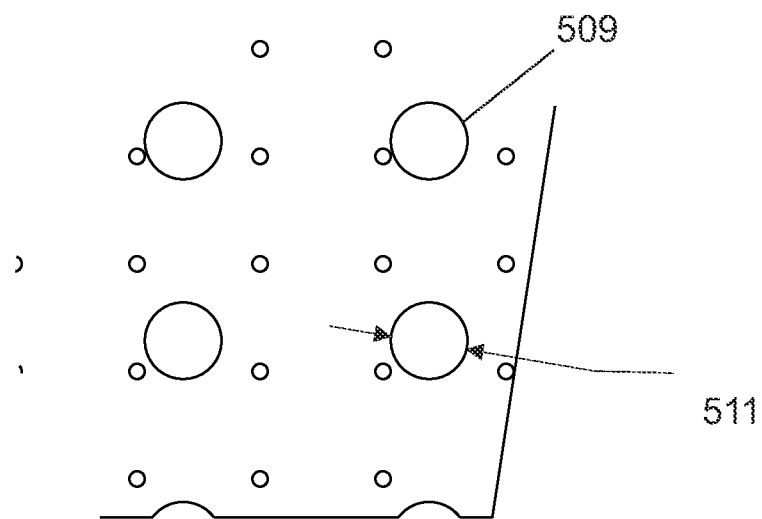
FIG. 41 is an expanded view of the objects of FIG. 39 at location B.
Figure 42:
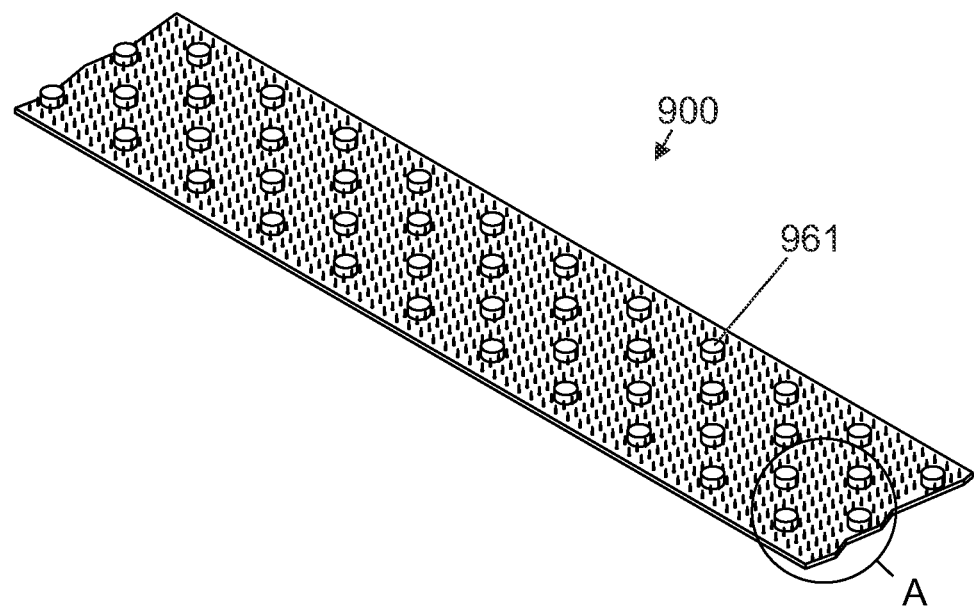
FIG. 42 is a perspective view of a portion of another alternate embodiment filter wrap of the present invention.
Figure 43:
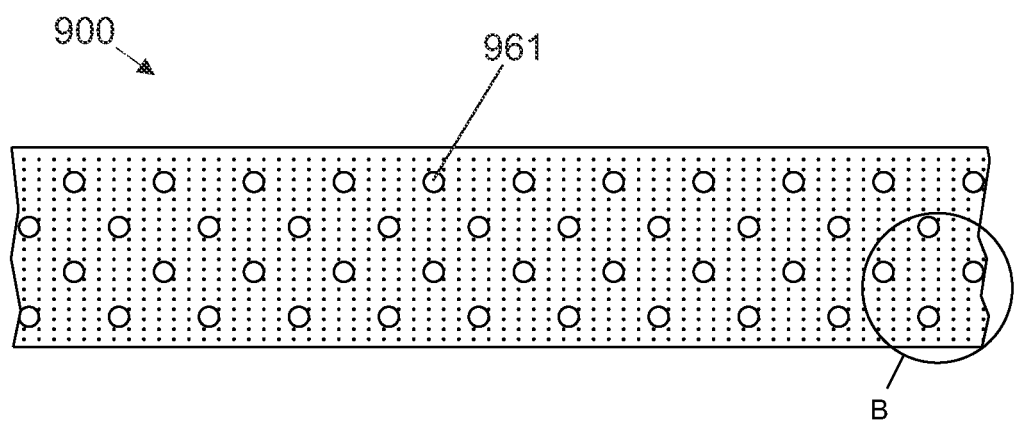
FIG. 43 is a plan view of the filter wrap of FIG. 42.
Figure 44:
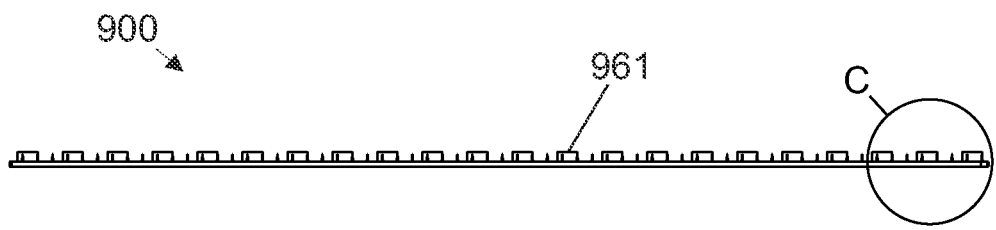
FIG. 44 is a side elevational view of the objects of FIG. 42.
Figure 45:
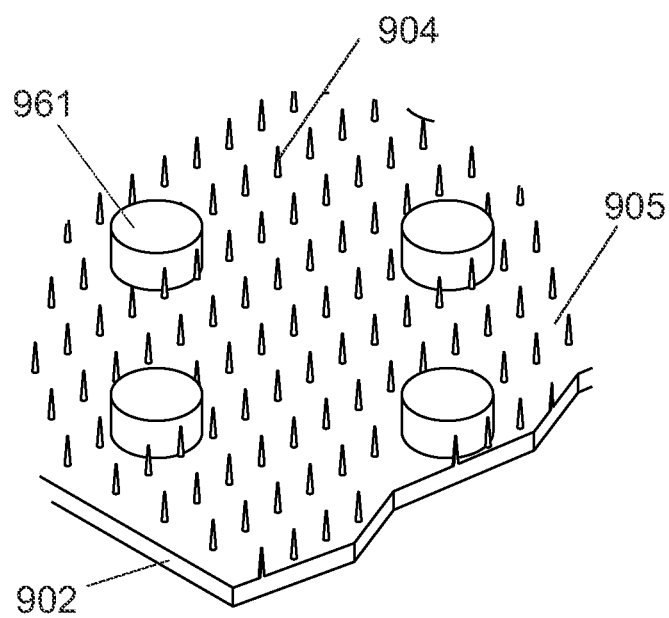
FIG. 45 is an expanded view of the objects of FIG. 42 at location A.
Figure 46:
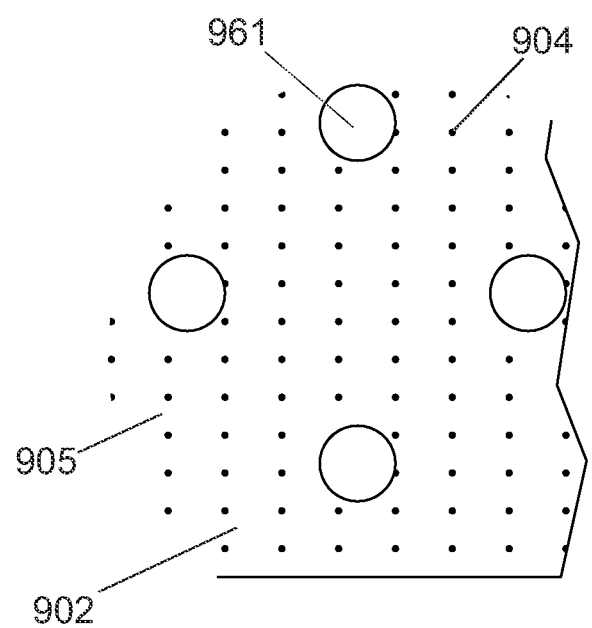
FIG. 46 is an expanded view of the objects of FIG. 43 at location B.
Figure 47:
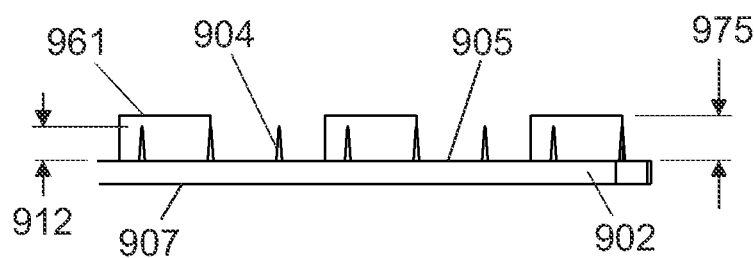
FIG. 47 is an expanded view of the objects of FIG. 44 at location C.
Figure 48:
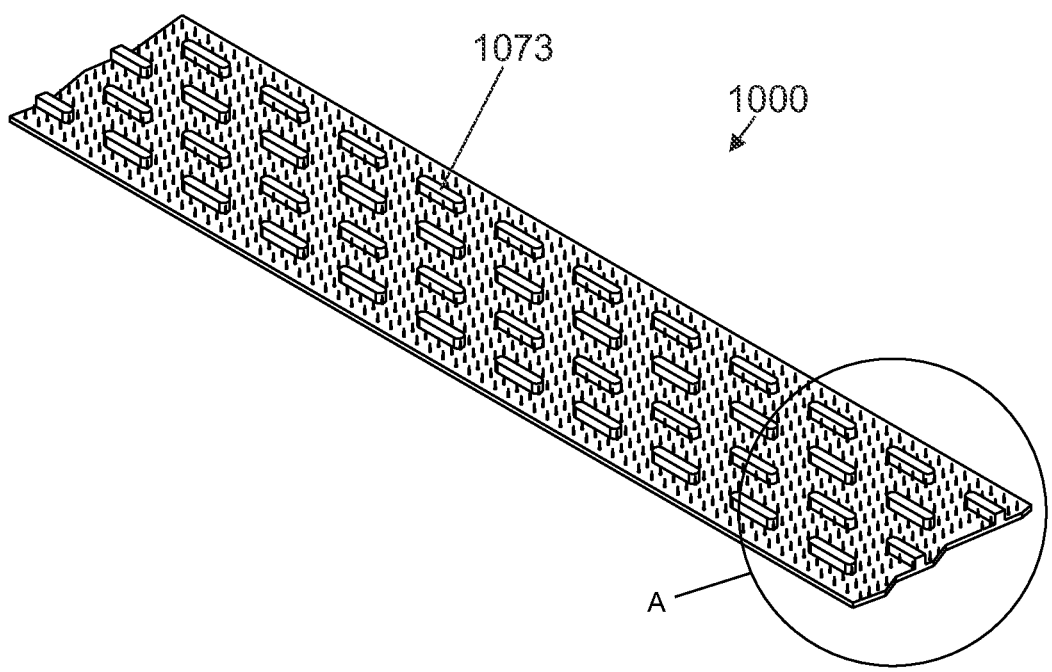
FIG. 48 is a perspective view of another alternate embodiment filter wrap of the present invention.
Figure 49:
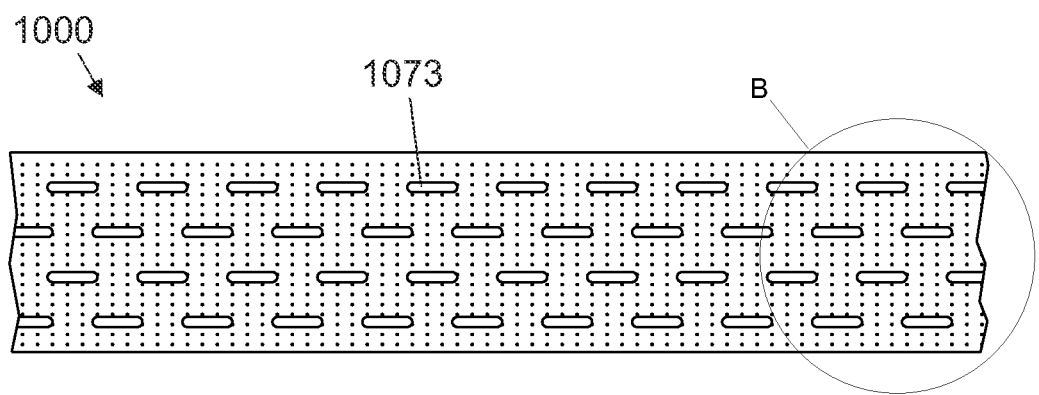
FIG. 49 is a plan view of the objects of FIG. 48.
Figure 50:
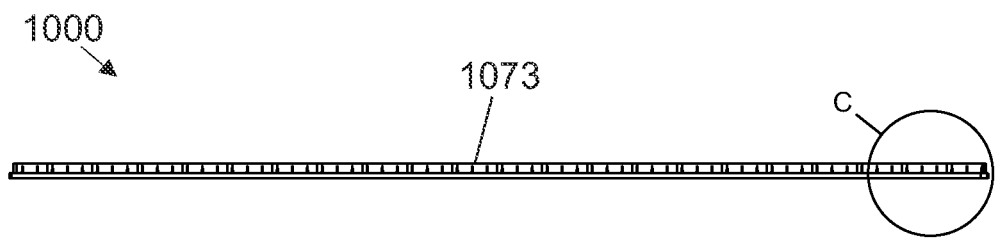
FIG. 50 is a side elevational view of the objects of FIG. 48.
Figure 51:
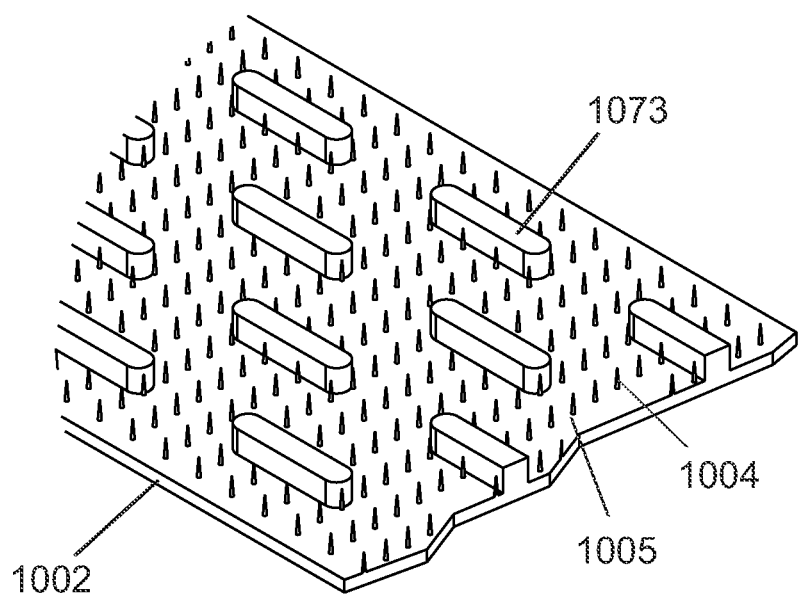
FIG. 51 is an expanded view of the objects of FIG. 48 at location A.

FIGS. 36 and 37 depict an alternate embodiment film strip 500 that is identical in all aspects of form and function to film strip 200 (FIGS. 2 to 8) except as subsequently described. Film strip 500 has formed therein perforations 509. Linear slits 535 create multiple alternate embodiment filter wraps 540 (FIGS. 38 to 41), filter wraps 540 being identical in all aspects of form and function to filter wraps 400 (see FIGS. 12 through 15) except as subsequently herein described. Filter wrap 540 has perforations 509 of diameter 511 formed therein that provide a flow path through filter wrap 540. In filter media formed of filter wraps 540 fluid flow is primarily through spaces formed between the surfaces of wraps 540, but may also flow between these spaces through perforations 509. The number, placement and diameter 511 of perforations 509 may be optimized to meet specific filtering requirements. Perforations 509 are formed by punching or cutting out a material segment of diameter 511.

Inter-layer spaces or gaps in filter elements of the present invention may be controlled in the winding or forming process to provide flow passages or gaps of desired width. In some embodiments features are added to the filter wrap to aid in maintaining these passages or gap within desired limits. For instance, filter wrap 900 of the present invention (see FIGS. 42 through 47) is identical in all aspects of form and function to filter wrap 400 (see FIGS. 14 through 19) except as subsequently described. Filter wrap 900 has formed on first surface 905 of film portion 902 of wrap 900 protuberances 961 of height 975, height 975 being greater than height 912 of nanofibers 904. When filter wrap 900 is wound or folded to create a filter element of the present invention, protuberances 961 establish and maintain a minimum width for the gap between adjacent layers of wrap 900. The position, height and diameter of protuberances, along with their number/density on first surface 905 of film portion 902 may be optimized for maximal filter efficiency while minimizing back pressure. In other embodiments, the protuberances may be configured and positioned to achieve certain filtering characteristics.

Figure 52:
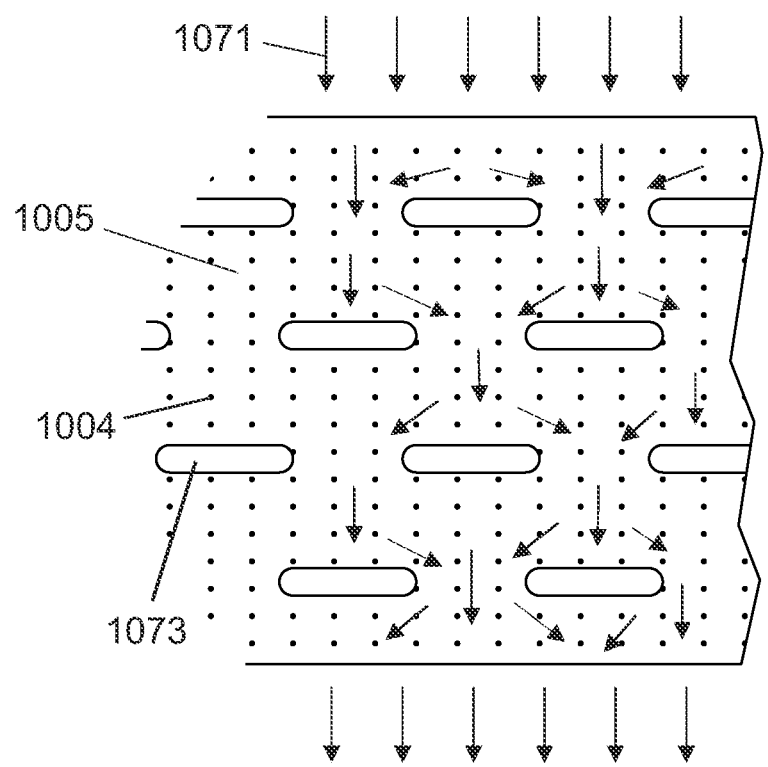
FIG. 52 is an expanded view of the objects of FIG. 49 at location B showing direction of fluid flow (indicated by arrows).
Figure 53:
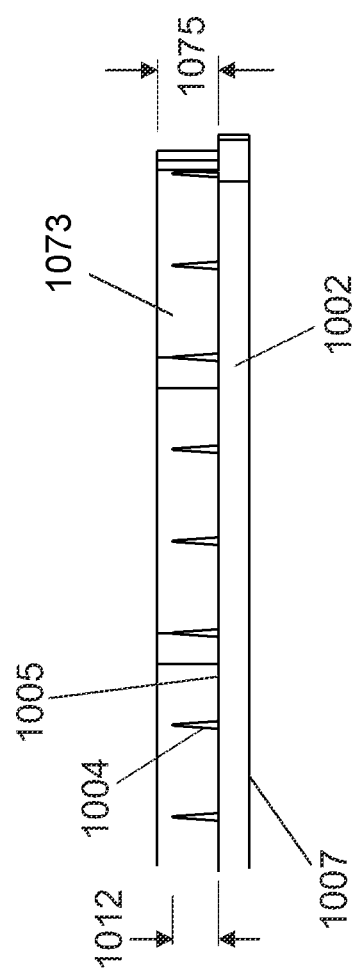
FIG. 53 is an expanded view of the objects of FIG. 50 at location C.
Figure 54:
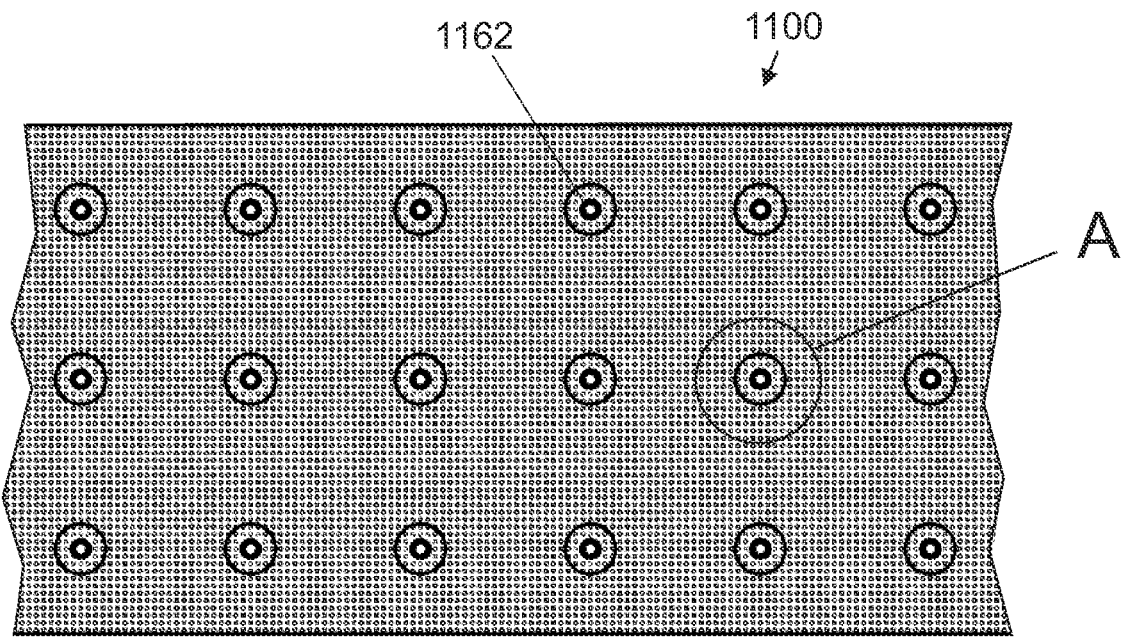
FIG. 54 is a plan view of another alternate embodiment filter wrap of the present invention.
Figure 55:
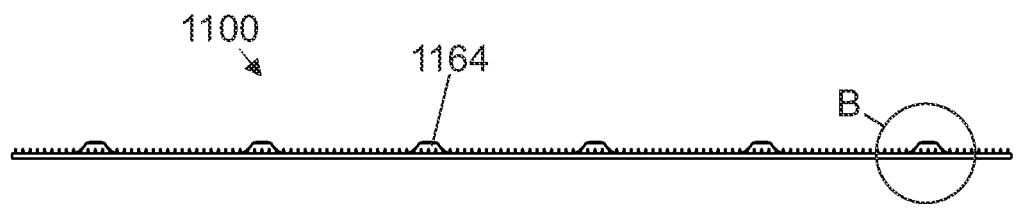
FIG. 55 is a side elevational view of the objects of FIG. 54.
Figure 56:
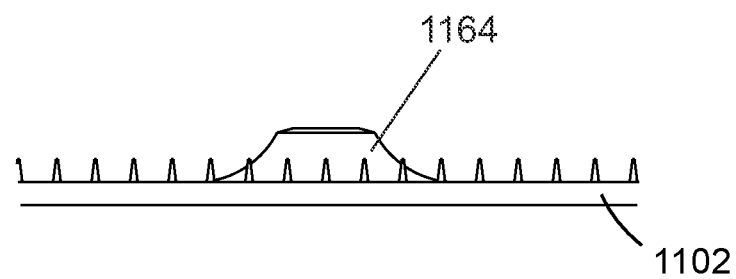
FIG. 56 is an expanded view of the objects of FIG. 55 at location B.
Figure 57:
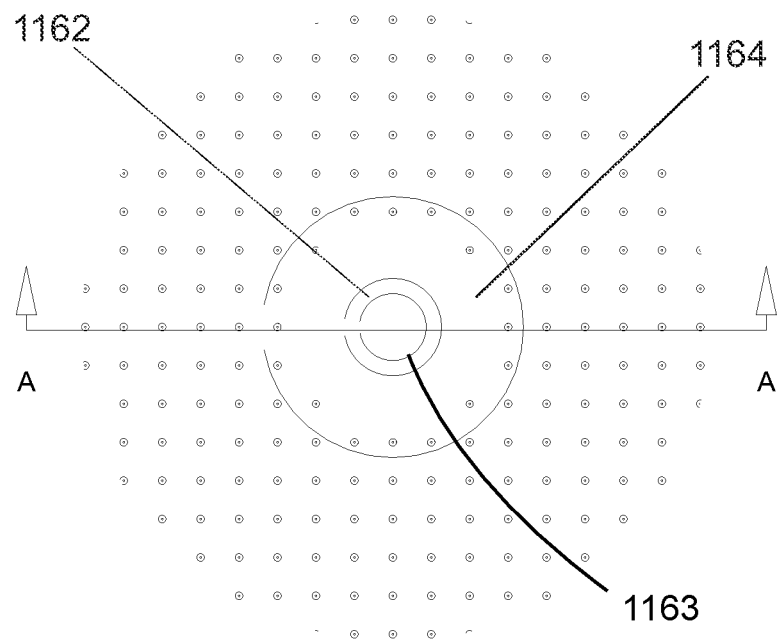
FIG. 57 is an expanded view of the objects of FIG. 54 at location A.
Figure 58:
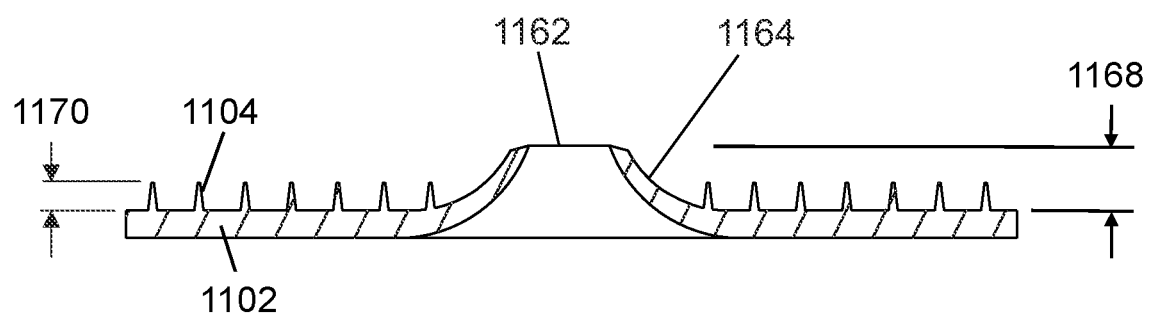
FIG. 58 is an expanded sectional view of the objects of FIG. 57 at location A-A.
Figure 59:
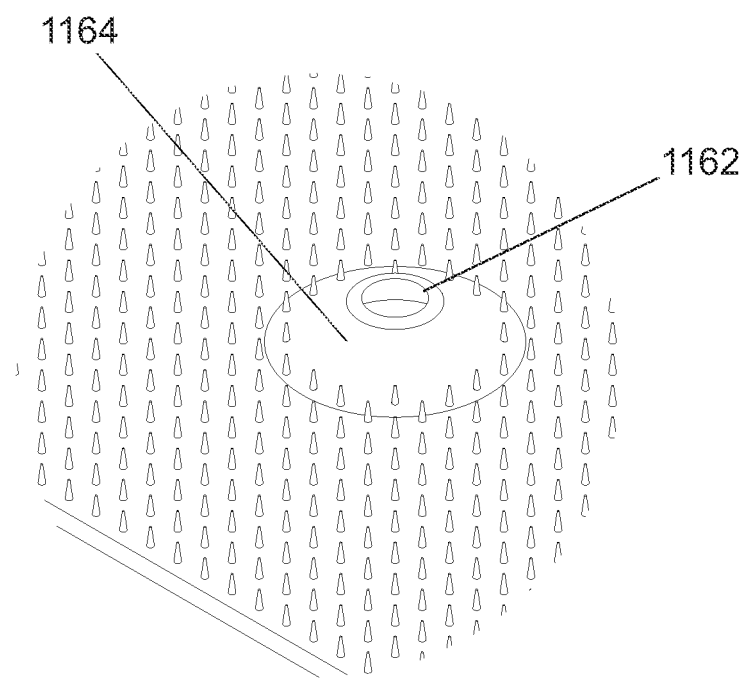
FIG. 59 is an expanded view of a perforation of the filter wrap of FIG. 54.

Considering now alternate embodiment filter wrap 1000 depicted in FIGS. 48 to 53, filter wrap 1000 is identical in all aspects of form and function to filter wrap 900 except as subsequently described. Rather than having cylindrical protuberances like feature 961 of filter wrap 900, filter wrap 1000 has protuberances 1073 with a horizontally elongate shape or profile distributed and positioned to increase the length of the flow path for fluids 1071 passing through a filter element formed of filter wraps 1000 as shown in FIG. 52. Protuberances 1073 may also be configured to create turbulence in the flow stream to increase the number of contaminant particles that pass within the electrostatic capture range of nanofibers 1004. Indeed, the size, shape, height 1075 and distribution of protuberances may be optimized to achieve maximal filter efficiency without adversely affecting the back pressure on the fluid stream.

In another embodiment, perforations are formed in a filter wrap of the present invention in a manner that creates deformation in the wrap sufficient to maintain a minimum width in the inter-layer flow space. Referring now to FIGS. 54 through 59 depicting filter wrap 1100, perforations 1162 are formed in a manner that creates a surrounding deformed region 1164 of height 1168, height 1168 being greater than height 1170 of nanofibers 1104. In a preferred method of manufacture, perforations 1162 are formed by piercing with a sharpened element that does not remove tissue, but rather creates perforation 1162 by deforming film portion 1102 until the point of the sharpened piercing element punctures film portion 1102. In figures depicting filter wrap 1100 edges 1163 of perforations 1162 have a uniform height 1168 and shape. The piercing method used to form perforations 1162 may produce heights 1168 that vary within an acceptable range, and form edges 1163 with irregular shapes. Perforations 1162 and deformed region 1164 provide not only separation between adjacent filter wrap layers, but also provides a path for flow between adjacent inter-layer flow spaces.

In the alternate embodiment filter element of FIG. 35, inter-layer spaces 809 of filter element 806 are filled with filter media 820 that may be a non-woven fabric or mat. In certain embodiments of the present invention an elongate strip of non-woven filter media is affixed to a filter wrap of the present invention to form a filter wrap assembly that may be wound or folded as previously described to form a filter element of the present invention. The width of the elongate non-woven media strip is approximately equal to the width of the nanofiber bearing filter wrap. In preferred embodiments of the present invention, the elongate non-woven media strip is affixed to the nanofiber bearing filter wrap of the present invention by needling, a fixation method commonly used for joining layers of non-woven and woven fabrics to form a layered construct.

In needling, the layers to be joined are penetrated by a needling blade, the exterior surface of which has formed thereon features that engage with fibers in the fabric layers so as to cause entanglements that join the layers. In the case of filter wrap assemblies of the present invention, needling also form holes in the film portion of the nanofiber bearing filter wrap. This allows flow through the holes formed in the manner as filter wrap 540 (FIGS. 38 to 41) and filter wrap 1100 (FIGS. 54-59) between adjacent inter-layer spaces. Indeed, the holes produced by needling have a form like holes 1162 in filter wrap 1100, that is, each hole 1162 having a deformed region 1164 produced by penetration by the needling blade.

Figure 60:
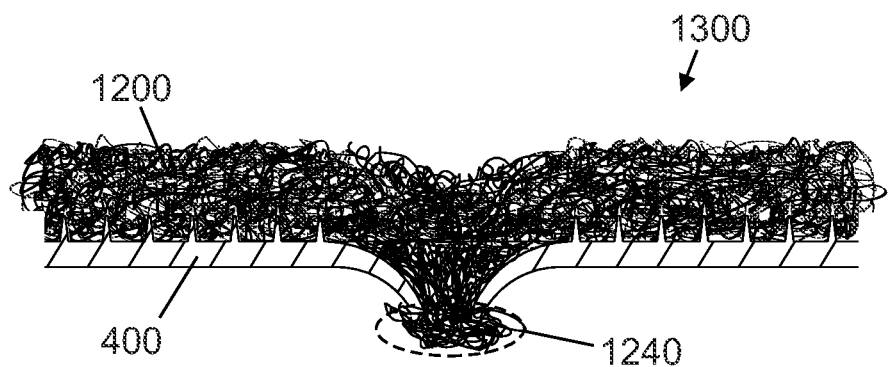
FIG. 60 is an expanded sectional view of an alternate embodiment filter wrap assembly wherein an elongate strip of non-woven mat is attached to a nanofiber-bearing filter wrap of the present invention by needling.
Figure 61:
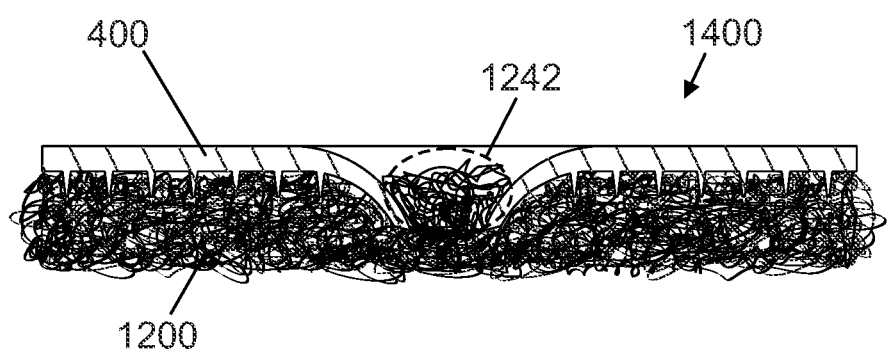
FIG. 61 is an expanded sectional view of a second alternate embodiment filter wrap assembly wherein an elongate strip of non-woven mat is attached to a nanofiber-bearing filter wrap of the present invention by needling.
Figure 62:
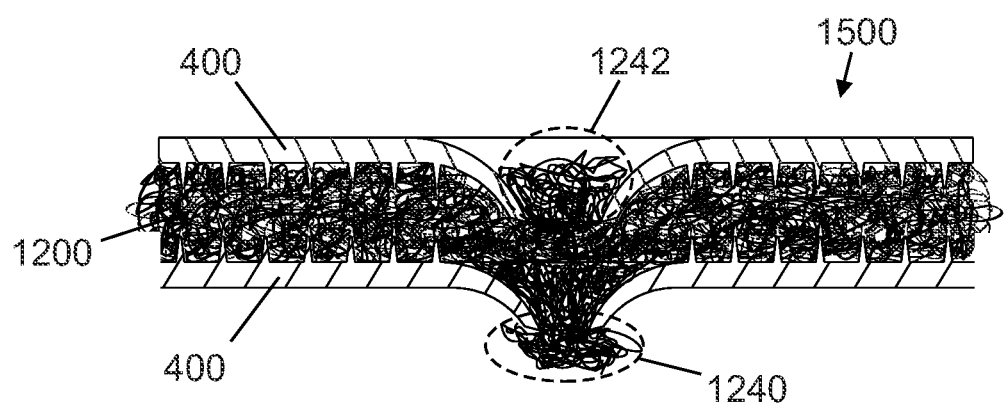
FIG. 62 is an expanded sectional view of a third alternate embodiment filter wrap assembly wherein an elongate strip of non-woven mat is positioned between two nanofiber-bearing filter wraps of the present invention and secured thereto by needling.

FIG. 60 depicts an expanded sectional view of a filter wrap assembly 1300 wherein filter wrap 400 (FIGS. 14 to 19) is affixed to non-woven filter media 1200 by a needling process. Fibers of media 1200 are dragged through the hole formed in wrap 400 by a needling blade, and some tangled fibers 1240 remain bunched on the underside of wrap 400 so as to affix media 1200 to wrap 400. In FIG. 61, depicting a portion of filter wrap assembly 1400, filter medial 1200 is affixed to filter wrap 400 in a needling process in which fibers are dragged upward when the needling blade is withdrawn so as to create bunched tangled fibers 1242 on the top side of filter wrap 400. In FIG. 62, in yet another embodiment of a filter wrap assembly 1500 of the present invention, filter media 1200 is positioned between two filter wraps 400 and secured by a needling process in which bunched tangled fibers 1242 are formed above the upper filter wrap 400, and bunched tangled fibers 1240 are formed below the lower filter wrap 400. Filter media 1200 may be configured to create turbulence in fluid passing through inter-layer spaces 809. In some preferred embodiments, filter media 1200 is a non-woven mat of elongate filter ribbons ("bioribbons") as described in U.S. Pat. No. 11,014, 029, and optionally, nanofiber arrays on these bioribbons may be configured to optimally remove a specific contaminant.

Filter wrap assemblies of the present invention may be used to create filter elements like element 806 (see FIG. 35) in which inter-layer spaces 809 are filled with media 820. Filter media 1200 may also be configured to create turbulence in fluid passing through inter-layer spaces 809. In some preferred embodiments, filter media 1200 is a non-woven mat of elongate filter ribbons ("bioribbons") as described in U.S. Pat. No. 11,014,029, and optionally, nanofiber arrays on these bioribbons may be configured to optimally remove a specific contaminant.

Figure 63:
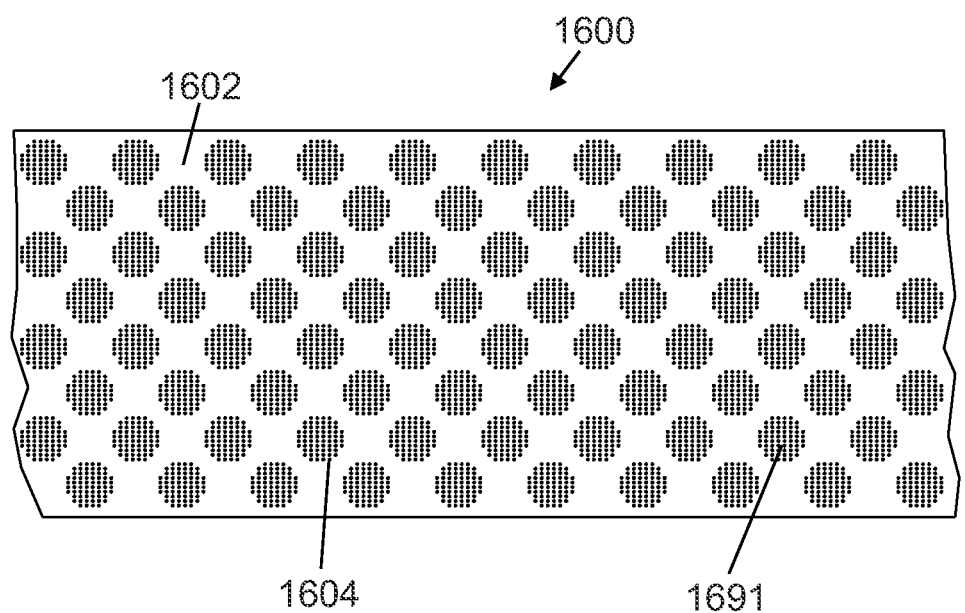
FIG. 63 is a plan view of an alternate embodiment filter wrap of the present invention.
Figure 64:
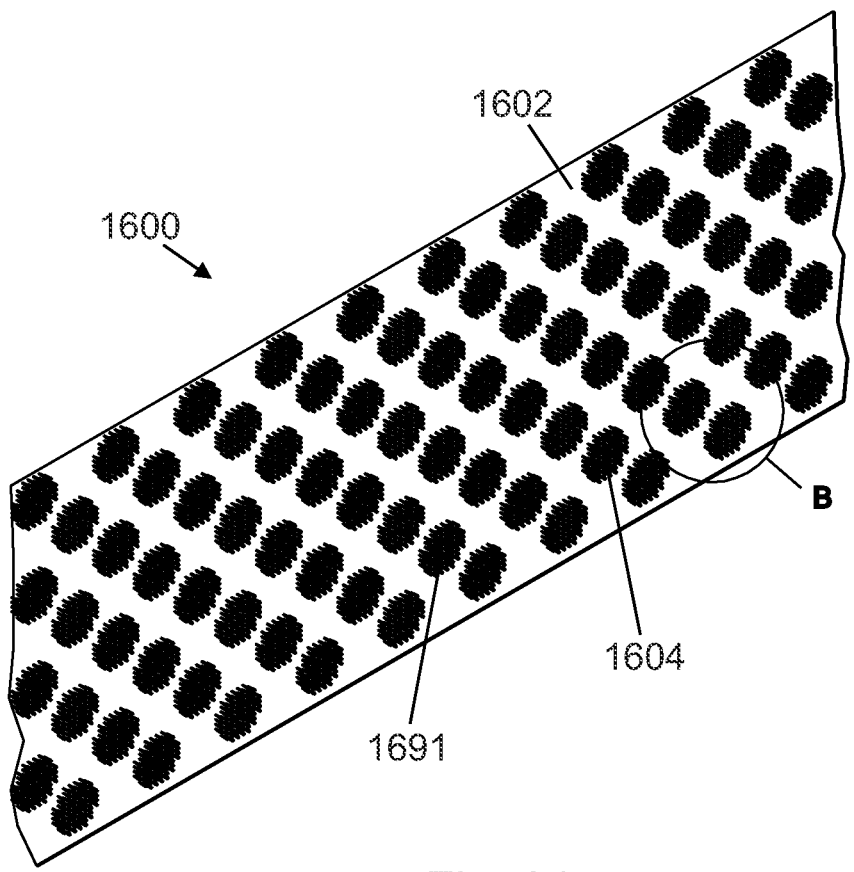
FIG. 64 is a perspective view of the filter wrap of FIG. 63.
Figure 65:
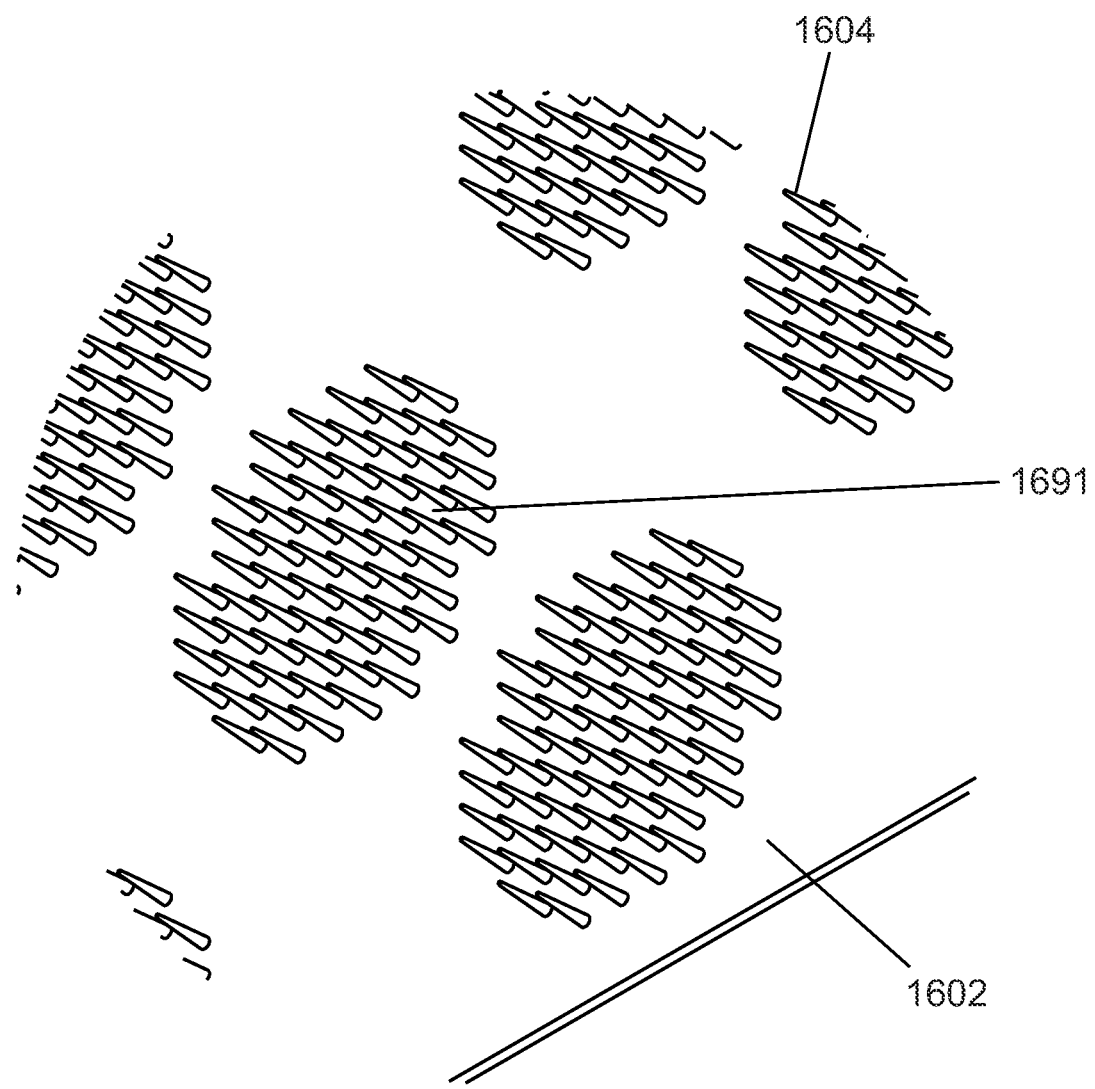
FIG. 65 is an expanded view of the filter wrap of FIG. 64 at location A.

Filter wraps previously herein described may, when viewed in the flow direction, have on a surface thereof a continuous nanofiber array that extends uninterrupted in the flow direction. This may lead to unequal loading of the filter wrap with nanofibers formed in the the upstream portion of the filter removing a disproportionate share of contaminants from the fluid stream. Other embodiments of the present invention have nanofiber arrays that are not continuous, but rather are distributed in a manner that allows more even distribution of contaminant removal. One such embodiment is depicted in FIGS. 63 through 65 depicting a portion 1600 of a filter wrap in which nanofibers 1604 formed on surface 1602 of portion 1600 form discrete arrays 1691 that are displaced one from another so as to form flow paths that expose nanofibers 1604 in downstream portions of a path to flow that has not been exposed to upstream nanofibers 1604. In this manner, loading of the filter is distributed more evenly between upstream and downstream portions of filter wrap 1600. Portion 1600 is depicted with circular arrays 1691. In other embodiments arrays 1691 may be shaped as regular or irregular polygons, as ovals, or have perimeters formed of straight and/or curvilinear segments. All fall within the scope of this invention. Arrays 1691 are regularly spaced one from another to create flow paths. In other embodiments this spacing may be irregular and vary with position relative to the flow stream. Any filter wrap that has arrangement of discrete nanofiber arrays spaced one from another to form irregular flow paths so as to increase the filtering activity of downstream nanofiber arrays falls within the scope of this invention.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A filter element, comprising:
a first polymer film including a first surface, a second surface opposite the first surface, an array of nanofibers extending from the first surface, a first end, a second end opposite the first end, and opposing first and second edges extending from the first end to the second end; and
a second polymer film including a first surface, a second surface opposite the first surface, a second array of nanofibers extending from the first surface, a first end, a second end opposite the first end, and opposing first and second edges extending from the first end to the second end;
wherein the first and second polymer films are spiral wound together such that the second surface of the first polymer film is fixed to the second surface of the second polymer film, and the first surface of the first polymer film faces and is spaced from the first surface of the second polymer film so as to defined therebetween interlayer gaps through which a fluid can be flowed to contact the first and second arrays of nanofibers and thereby remove at least one contaminant from the fluid.

2. The filter element of claim 1, wherein the interlayer gaps extend through the filter element from the first edges to the second edges of the spiral wound first and second polymer films such that the fluid when flowed through the filter element flows along the first surfaces of the first and second polymer films.

3. The filter element of claim 2, further comprising a turbulence-inducing filter media received in the interlayer gaps between the first surfaces of the first and second polymer films.

4. The filter element of claim 2, wherein when the fluid is flowed through the filter element the first array of nanofibers at least partially filters a first contaminant from the fluid and the second array of nanofibers at least partially filters a second contaminant from the fluid.

5. The filter element of claim 1, further comprising:
a plurality of perforations defined through the first and second polymer films and configured to allow the fluid to flow between adjacent interlayer gaps therethrough.

6. The filter element of claim 5, further comprising a turbulence-inducing filter media received in the interlayer gaps between the first surfaces of the first and second polymer films.

7. The filter element of claim 1, further comprising:
a plurality of protuberances configured to maintain the interlayer gaps on the first surface of at least one of the first or second polymer films;
wherein the protuberances extend further from the first surface of the at least one of the first or second polymer films than the nanofibers.

8. The filter element of claim 7, wherein the protuberances have a non-cylindrical profile and are distributed about the first surface of the at least one of the first or second polymer films so as to increase a length of a flow path along which the fluid flows when the fluid is flowed through the filter element.

9. The filter element of claim 7, wherein the protuberances have a horizontally elongated plan view profile and are distributed about the first surface of the at least one of the first or second polymer films so as to increase a length of a flow path along which the fluid flows when the fluid is flowed through the filter element.

10. The filter element of claim 1, further comprising:
a plurality of perforations defined through the first and second polymer films, each perforation surrounded by a non-planar deformed region;
wherein the deformed regions extend further from either the first surface or the second surface of the first and second polymer films than the nanofibers extend from the first surfaces and thereby maintain the interlayer gaps.

11. The filter element of claim 10, further comprising a turbulence-inducing filter media received in the interlayer gaps between the first surfaces of the first and second polymer films.

12. The filter element of claim 11, further comprising an enclosure supporting a periphery of the filter element.

13. The filter element of claim 12, wherein when the fluid is flowed through the filter element the first array of nanofibers at least partially filters a first contaminant from the fluid and the second array of nanofibers at least partially filters a second contaminant from the fluid.

\* \* \* \* \*